United States Patent [19]

Mashimo et al.

[11] 4,047,187
[45] Sept. 6, 1977

[54] SYSTEM FOR EXPOSURE MEASUREMENT AND/OR FOCUS DETECTION BY MEANS OF IMAGE SENSER

[75] Inventors: Yukio Mashimo, Tokyo; Nobuaki Sakurada, Kanagawa; Tadashi Ito, Kanagawa; Fumio Ito, Kanagawa; Nobuhiko Shinoda, Tokyo, all of Japan

[73] Assignee: Canon Kabushiki Kaisha, Tokyo, Japan

[21] Appl. No.: 563,462

[22] Filed: Mar. 31, 1975

[30] Foreign Application Priority Data

Apr. 1, 1974 Japan ................... 49-36790
Apr. 1, 1974 Japan ................... 49-36791
Apr. 1, 1974 Japan ................... 49-36792

[51] Int. Cl.$^2$ ............................ G03B 7/08
[52] U.S. Cl. ..................... 354/23 D; 250/201; 354/25; 354/31; 354/50; 356/222
[58] Field of Search ............. 354/23 D, 25, 50, 31, 354/43, 44; 250/201, 209, 211 J; 352/140; 356/222; 357/24

[56] References Cited

U.S. PATENT DOCUMENTS

| 3,713,371 | 1/1973 | Kurihara et al. | 354/25 |
| 3,717,077 | 2/1973 | Harvey | 354/31 |
| 3,786,263 | 1/1974 | Michon | 250/209 |
| 3,824,608 | 7/1974 | Toyoda | 354/23 D |
| 3,856,989 | 12/1974 | Weimer | 357/24 |
| 3,872,483 | 3/1975 | Numata et al. | 354/23 D |
| 3,898,676 | 8/1975 | Hosoe et al. | 354/25 |

*Primary Examiner*—L. T. Hix
*Assistant Examiner*—J. A. LaBarre
*Attorney, Agent, or Firm*—Toren, McGeady and Stanger

[57] ABSTRACT

The present invention relates to a system for exposure measurement and/or focus detection by means of image senser such as photo diode array (MOS image senser), CCD (charge coupled devices) consisting of a plural number of adjacently disposed respectively integrated fine light sensing elements whereby the image pattern of the object is scanned purely electrically in such a manner that the then obtained output of each light sensing element is converted into a digital value one after another for processing.

38 Claims, 14 Drawing Figures

SYSTEM FOR EXPOSURE MEASUREMENT AND/OR FOCUS DETECTION BY MEANS OF IMAGE SENSER

BACKGROUND OF THE INVENTION

1. Field of the Invention

The present invention relates to a system for exposure measurement for the optical instrument such as camera and/or focus detection for the image forming optics.

2. Description of the Prior Art

Among the conventional exposure measurement system for optical instrument such as camera in which the light measuring method suited for the photographic field at the time of taking photograph can be chosen there is one which is so constructed that a plural number of light sensing elements such as CdS cells intended for the spot light measurement and another plural number of light sensing elements such as CdS cells intended for the mean light measurement are provided at the positions different from each other whereby at taking photograph either the spot light measurement or the mean light measurement is selected in accordance with the conditons of the photographic field at taking photograph by comparing the output of the one light measuring method with that of the other light measuring method so as to carry out the suitable exposure measurement.

One of the example is the camera disclosed in U.S. Pat. No. 3,690,241, in which camera the first light sensing element is disposed so as to be brought in front of the film while the second light sensing element is disposed so as to be opposed to the plane of the pentagonal prism composing a view finder optics of the camera through which plane the light beam goes out of the pentagonal prism whereby the first light sensing element serves as that for the so called spot light measurement responsing to a comparatively small part of the light beam to be exposed to the film while the second light sensing element serves as that for the so called mean light measurement responsing to almost all the light beam coming from the photographic field. Hereby the first and the second light sensing element can be connected with the same exposure measurement circuit selectively by means of the manual operation from outside of the camera. Therefore it is possible for a photographer to select either the spot light measurement or the mean light measurement in accordance with the then condition of the photographic field so as to carry out a suitable exposure measurement by selectively connecting the first or the second light sensing element to the exposure measuring circuit and comparing the output of the one light measuring method with that of the other light measuring method for example by means of meter.

However, in case of the exposure measuring system constructed as mentioned above, the light sensing element for the spot light measurement is disposed at a certain determined position with regard to the image plane so that it is disadvantageous that the light beam only at a certain determined point of the object in the image plane could be measured, whereby for example in case of the single reflex camera there is a restriction that the range capable of the spot light measurement is determined in advance because the spot light measurement can not be carried out at any optical position in the object, of the image plane in the view finder.

On the other hand, various methods respectively devices for detecting the focus point of the image forming optics by utilizing the photoelectric characteristics of the photoelectric converting elements have so far been proposed, whereby what is theoretically considered to be able to obtain the focus point with comparatively high accuracy is the method as proposed by the Japanese Patent Publication No. Sho 42-14096 according to which a plural number of the parts having a fine but proper area are provided on the focus plane so as to obtain the electrical output by converting the light amount of each fine part by means of the photoelectric converting element in such a manner that the differences of the electrical outputs between two adjacent fine parts are converted in absolute values or squared value and then added whereby the focus point is considered to be obtained when the added value is maximum.

However, in case of the device disclosed in the Japanese Patent Publication No. Sho 42-14096 the analog amount of the output of each photoelectric converting element is processed and therefore the composition of the signal processing circuit for processing the output of each photoelectric converting element is much complicated so that the exact detection is practically impossible due to the errors taking place at processing the output signals, which is disadvantageous. Hereby further the composition of the circuit is much more complicated according as the number of the photoelectric converting elements increases so that the number of the elements to be used is necessarily restricted.

Further, as is disclosed for example, in the Japanese Utility Model Publication No. Sho 48-43379, a device in which a light sensing means consisting of a plural number of fine light sensing elements is used for the focus point detection and the exposure measurement is so far known whereby in case of the device disclosed in the Japanese Utility Model No. Sho 48-43379, a method according to analog control is adopted according to which method the analog amount of the output of each light sensing element in the light sensing member is processed so as to control the focus point detecting and exposure measuring device. However, in the analog control there is a theoretical instability in such a manner that in case one light sensing means is used for the focus detection and for the exposure measurement the composition of the electrical circuit becomes complicated, whereby the error becomes larger at the time of the focus point detection and of the exposure measurement so that the exact measurement is practically impossible. Further, in case the light sensing system is composed of a plural number of the light sensing elements, the composition of the circuit becomes much more complicated according as the number of the light sensing elements increases so that the number of the light sensing elements is necessarily limited, which makes the exact measurement all the more difficult.

SUMMARY OF THE INVENTION

A purpose of the present invention is to offer a new system for the exposure measurement and/or for focus point detection of the image forming optics according to which system all of the above mentioned shortcomings of the conventional exposure measurement system, the conventional focus point detection system and the system in which one light sensing means is used for the exposure measurement and the focus point detection can be eliminated.

Further another purpose of the present invention is to offer a new system for the exposure measurement and/or for focus point detection of the image forming optics according to which system all of the above mentioned shortcomings of the conventional exposure measurement system, the conventional focus point detection system and the system in which one light sensing means is used for the exposure measurement and the focus point detection can be eliminated, by scanning purely electrically the image pattern of the object by means of the image senser consisting of a plural number of the disposed respectively integrated fine light sensing elements and converting the then obtained output of the light sensing elements.

Further another purpose of the present invention is to offer a new exposure measurement system capable of automatically selecting a light measurement method suited for the condition of the photographic field.

Further another purpose of the present invention is to offer is to compose the exposure measurement system in such a manner that by means of the image senser any optional fine part of the brightness in the total image plane of the photographic field can be selectively measured.

Further another purpose of the present invention is to compose the exposure measurement system in such a manner that by means of the image senser the spot light measurement can be carried out on any optional fine part of the brightness in the total image plane of the photographic field, while the mean light measurement can be carried out for the total image plane of the photographic field so that either of the light measuring system can be selected automatically by means of the output of both of the above light measuring systems.

Further another purpose of the present invention is to compose the exposure measurement system in such a manner that by scanning the image pattern of the object by means of the light sensing means disposed so as to receive the light beam coming from the object to be photographed and presenting a plural number of the fine light sensing elements consisting of the image senser such as photodiode array (MOS image senser), CCD (charge coupled devices) and so on an output is produced in each fine light sensing element of the light sensing means so as to correspond to the position of the object to be photographed and by selectively taking out the output a desired spot light measurement can be carried out for the object to be photographed.

Further another purpose of the present invention is to offer a new focus point detecting system which is so constructed that at the image forming position of the image forming optics or at the position equivalent to the image forming position an image senser consisting of a plural number of the fine disposed respectively integrated light sensing elements is arranged and the outputs of the light sensing elements in the image senser are converted into digital values one after another in accordance with the arranged order while the absolute values of the differences between the digital values of the outputs between the adjacent light sensing elements are summarized one after another whereby the focus point is considered to be obtained when the total sum of the absolute values of the differences between the digital values becomes largest during the adjustment of the image forming optics.

Further another purpose of the present invention is to compose a camera capable of automatically adjusting the focussing of the photographic optics, by applying in the actual camera a focus point detecting system so constructed that by means of an image senser presenting a plural number of the fine light sensing elements the image pattern of the object formed by the optics is purely electrically scanned and the then obtained scanning signals are converted into digital values one after another while the absolute values of the differences between the digital values of the adjacent light sensing elements are summarized one after another whereby the focus point of the optics is detected by detecting the variation of the summarized value during the adjustment of the optics.

Further another purpose of the present invention is to offer a new system for the exposure measurement and for the focus point detection by means of one common light sensing means which system is so constructed that the combined focus signal as well as the exposure signal are obtained by scanning the image of the object by means of an image senser consisting of a plural number of the fine disposed respectively integrated light sensing elements and by converting each of the then obtained output of each light sensing element into digital value one after another.

Further other purpose of the present invention will be disclosed in the following explanation to be made for the embodiments of the present invention in accordance with the accompanying drawings.

BRIEF DESCRIPTION OF THE DRAWINGS

FIG. 4 shows important parts of a camera in which such an exposure measuring system as is shown in FIG. 2 is built in.

FIG. 9 shows a composition of important parts of the motion picture camera in which such a focus point detecting system as is shown in FIG. 7 is built in.

FIG. 11 shows a composition of important parts of the photographic camera in which such a system as is shown in FIG. 10 is built in.

DETAILED DESCRIPTION OF THE PREFERRED EMBODIMENT

Below several embodiments of the system for the exposure measurement and/or the focus point detection of an image forming optics by means of the image senser in accordance with the present invention.

Figure 8:
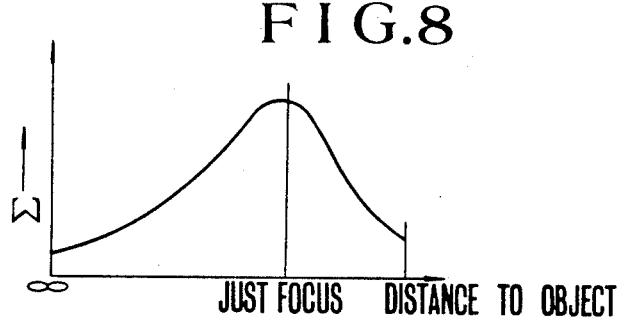
FIG. 8 shows a diagram for showing the variation of the value processed by the integrating circuit 109 corresponding to the displacement of the photographic optics L during the operation of the focus point detecting system shown in FIG. 7.
Figure 9:
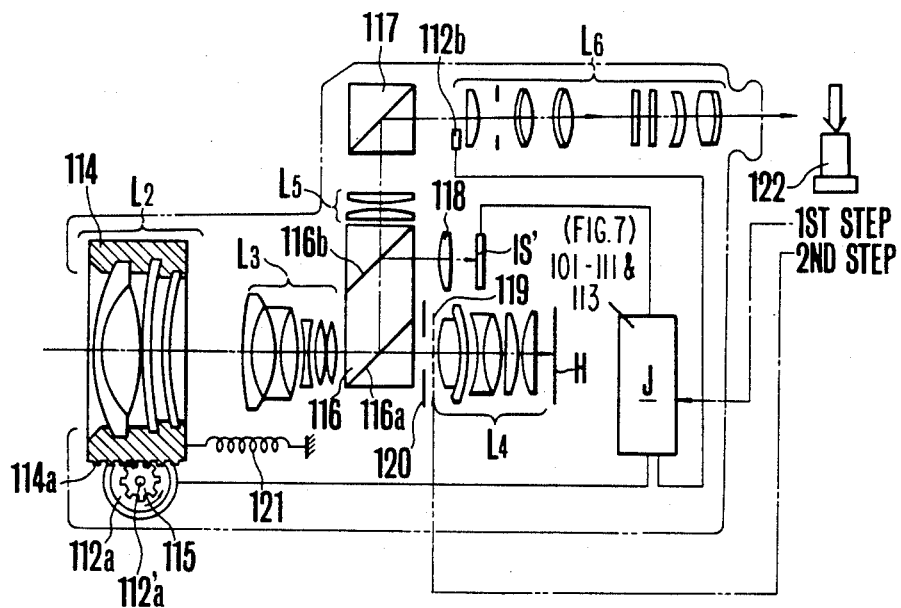
Figure 10:
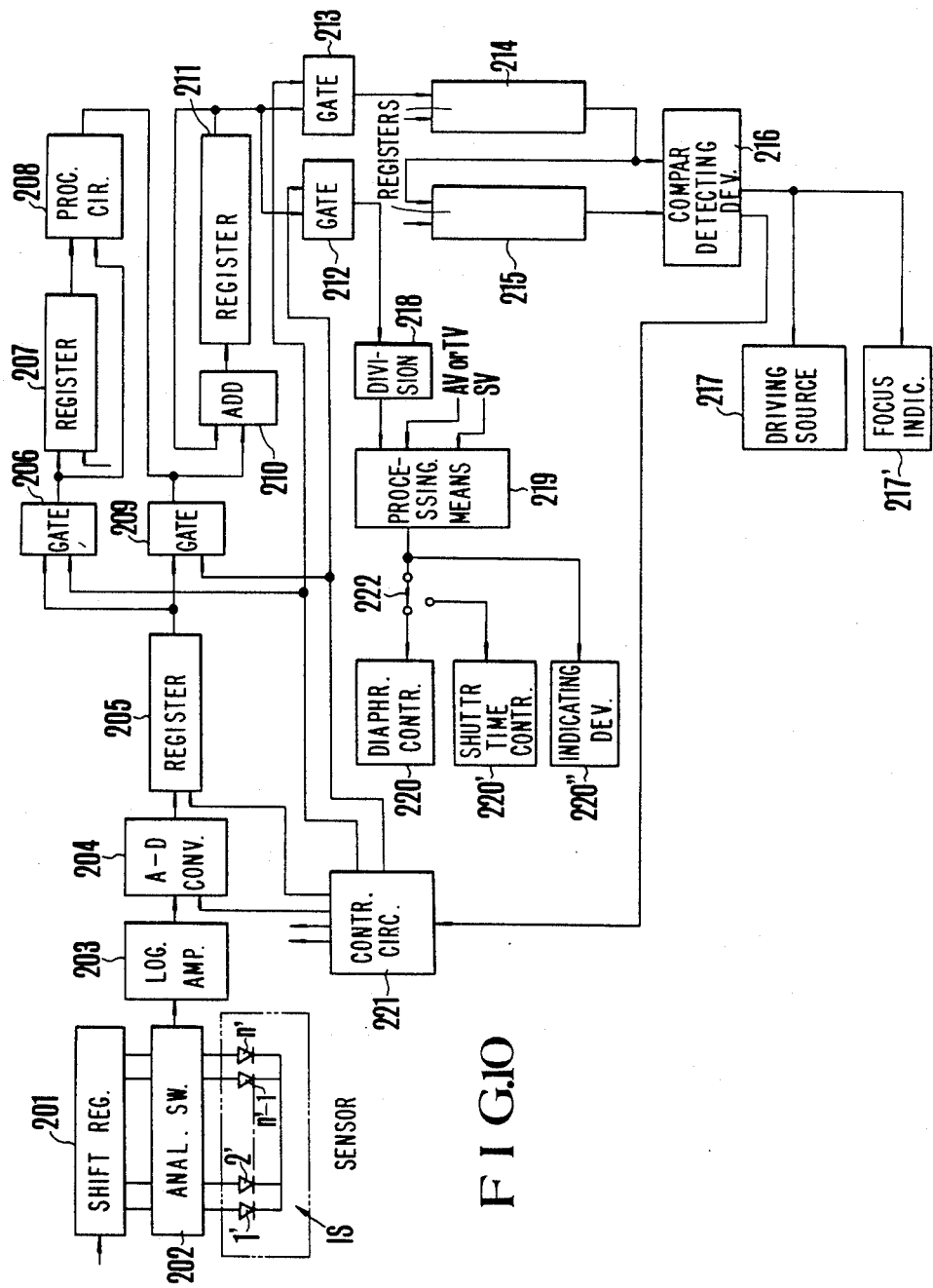
FIG. 10 shows an electrical block circuit diagram of an embodiment of an ordinary camera in which a system for the exposure measurement and the focus point detection by means of a common image senser in accordance with the present invention is adopted.
Figure 11:
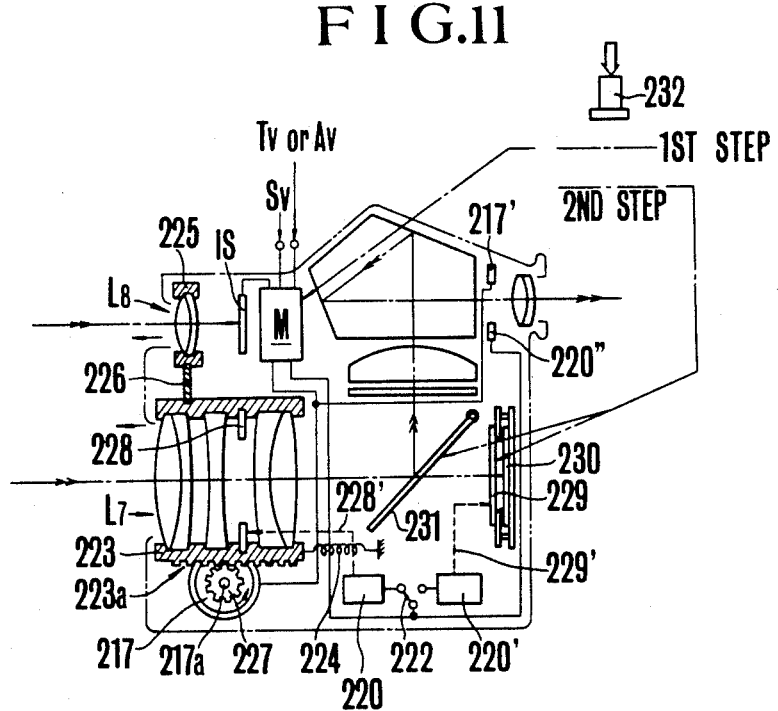

The embodiments of the exposure measuring system by means of the image senser are shown in FIG. 1 to FIG. 4, the embodiments of the focus point detecting system by means of the image senser are shown in FIG. 5 to FIG. 9 and the embodiments of the system for the exposure measurement and the focus point detection by means of a common image senser are shown in FIG. 10 and FIG. 11.

First of all an embodiment of an ordinary camera in which the system for the exposure measurement by means of the image senser in accordance with the present invention is adopted will be explained in accordance with FIG. 1 to FIG. 4.

Figure 1:
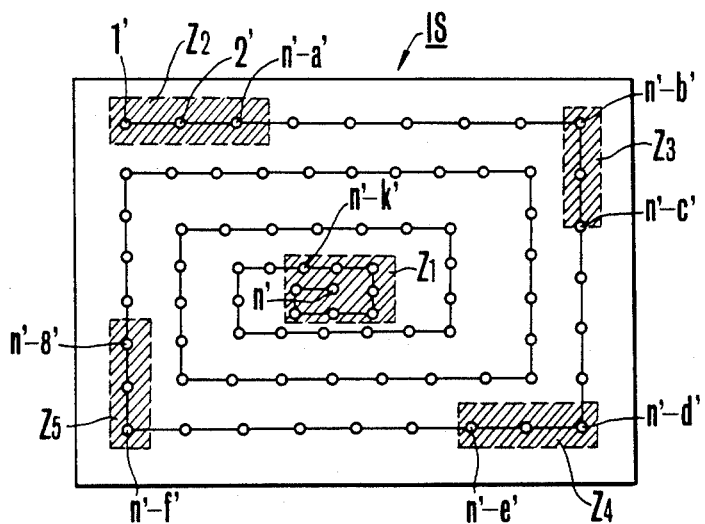
FIG. 1 shows an embodiment of the arrangement of light sensing elements suited for the exposure measuring system according to the present invention.

FIG. 1 shows an embodiment of the arrangement of a plural number of the fine light sensing elements in the image senser IS such as photo diode array (MOS image senser), CCD (charge coupled devices) and so on, whereby each of the fine light sensing elements is provided at the position corresponding to each of the fine parts of the image plane of the object to be photographed in such a manner that the brightness of each of the fine parts of the object, corresponding to each of the light sensing elements can be detected.

Figure 4:
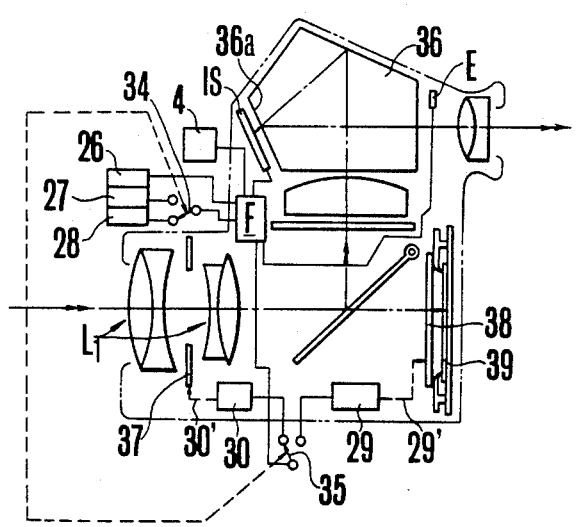

This image senser IS is provided in place of the light measuring element for the exposure measurement in the ordinary camera and therefore for the position at which the image senser is provided the neighborhood of the position equivalent to the image forming plane of the photographic lens is suited in case of the internal light measuring system (the so called TTL light measuring system according to which the light beam coming from the photographic field through the photographic lens is measured) and the view finder optical path is suited in case of the conventional single reflex camera, while the exposure measuring system in accordance with the present invention is preferred to be provided at such a position at which the light over almost all of the range of the photographic field can be measured, whereby as is shown in FIG. 4 one reflecting face of the pentagonal prism composing a view finder optics is made semipermeable in such a manner that the exposure measuring system is cemented on the semipermeable face or provided close to the semipermeable face.

In the image senser IS shown in FIG. 1, $1' \sim n'$ are the the light sensing elements while $Z_1$ is the spot zone for carrying out a spot light measuring at the central part of the image plane of the object to be photographed whereby the spot light measurement is carried out by the light sensing elements $n' - k' \sim n'$ situated in this spot zone $Z_1$, $Z_2$ is the spot zone for carrying out a spot light measuring at the left upper part of the image plane of the object to be photographed whereby the spot light measurement is carried out by means of the light sensing elements $1' \sim n - a'$ situated in this spot zone $Z_2$. $Z_3$ is the spot zone for carrying out a spot light measuring at the right upper part of the image plane of the object to be photographed, whereby the spot light measurement is carried out by means of the light sensing elements $n' - b' \sim n' - c'$ situated in this spot zone $Z_3$. $Z_4$ is the spot zone for carrying out a spot light measuring at the right lower part of the image plane of the object to be photographed, whereby the spot light measurement is carried out by means of the light sensing elements $n' - d' \sim n' - e'$ situated in this spot zone $Z_4$. $Z_5$ is the spot zone for carrying out a spot light measuring at the left lower part of the image plane of the object to be photographed, whereby the spot light measurement is carried out by means of the light sensing elements $n' - f' \sim n' - g'$ situated in this spot zone $Z_5$.

Figure 2:
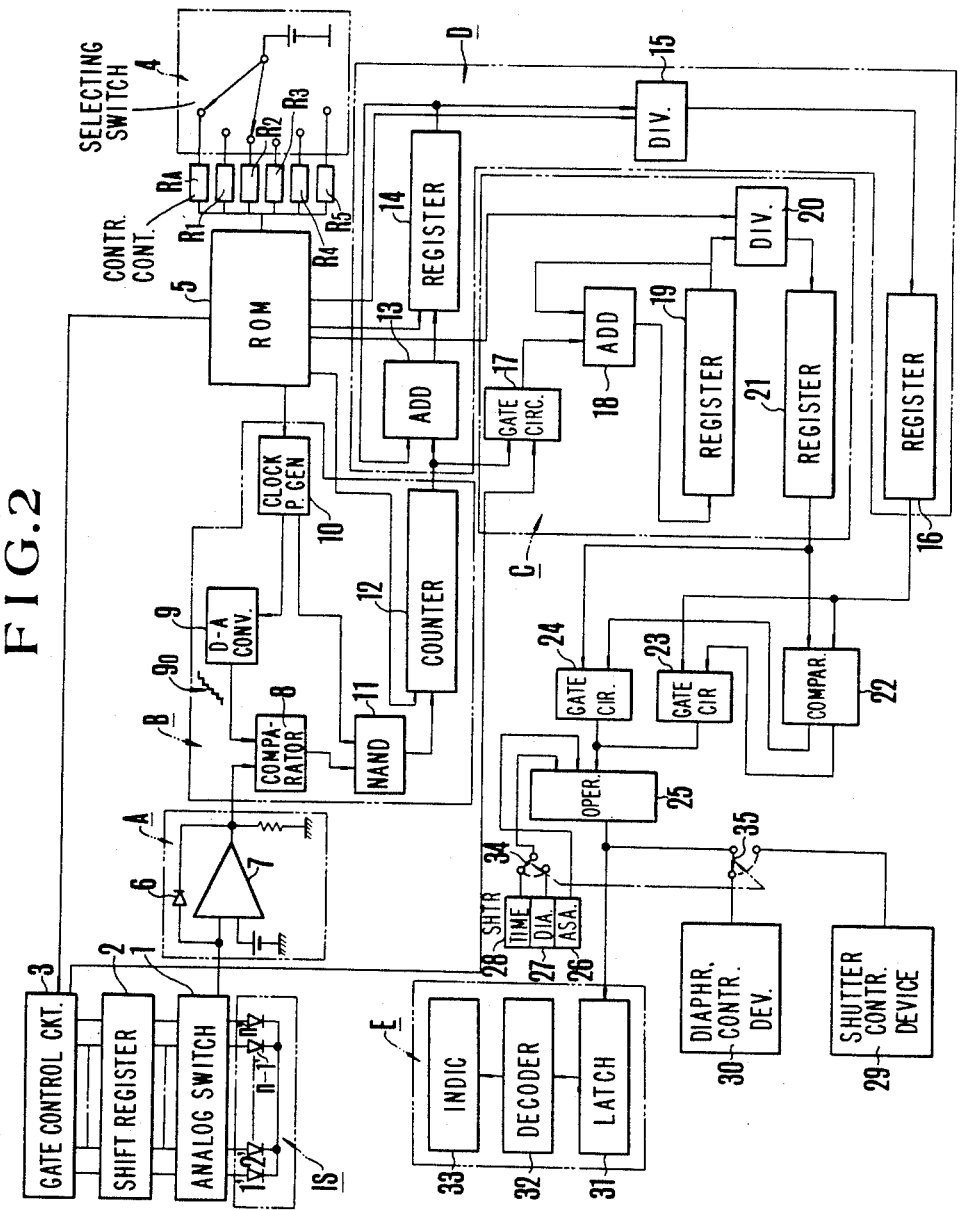
FIG. 2 shows a block circuit diagram of an embodiment of the exposure measuring system using the image senser IS as is shown in FIG. 1 in accordance with the present invention applied for a general camera.

FIG. 2 shows an electrical block wiring diagram of an embodiment of the exposure measurement system in accordance with the present invention by means of the image sensor IS shown in FIG. 1, whereby in FIG. 2, $1' \sim n'$ are the light sensing elements shown in FIG. 1, which elements are connected in series with an analog switch 1 for transmitting the output signals of the light sensing elements $1' - n'$ to the operational amplifier 7 at the next step one after another while the analog switch 1 is connected with the shift register 2. The shift register 2 is connected with the gate control circuit 3, which is controlled by the control signal of the ROM (Read Only Memory) device 5. The gate control circuit 3 is so constructed that by means of the signal of the ROM device the gate circuit 17 is controlled. 6 is a diode for composing a logarithmically compressing a circuit A together with the operation amplifier 7. 10 is a clock pulse generator for producing standard pulses by means of the signal from the ROM device 5 and is connected with the D - A (Digital-Analog) converter 9 at whose output terminal an output signal in form of step as is shown by $9_o$ in the drawing is produced. 8 is the comparison circuit whose input terminal is connected with the operational amplifier 7 and the D - A converter 9 so as to compare the outputs of both circuitries with each other. 11 is a gate circuit connecting the comparison circuit 8 with the clock pulse generator 10 and consisting of for example conventional NAND circuit or the like. 12 is a counter being controlled by means of the ROM device 5 and composing a A - D (Analog-Digital) converter together with the clock pulse generator 10, the D - A converter 9, the comparison circuit 8 and the gate circuit 11. 13 is the addition means whose input terminal is connected with the output terminal of the counter 12 and with the feed back path of the register in the next step being controlled by means of the ROM device 5. 17 is a gate circuit which is so constructed that in accordance with the selected gate of the ROM selecting switch for example, in case the spot zone $Z_1$ is selected the content of the counter 12 is transmitted to the addition means 18 by means of the signal of the gate control circuit 5 when the light sensing elements $n' - k'$ come in turn. 19 is the register which is controlled by the ROM device 5 and fed back to the addition means 18, whereby for example in case the spot zone $Z_1$ is selected the value of the light measurement of each light sensing elements after the elements $n' - k'$ is added one after another. 20 is the division means which is controlled by the ROM device 5 in such a manner that the content of the register 19 is divided by the total number of the light sensing elements in the respective spot zone, namely the total number ($k' + 1$ in this case) of the light sensing elements after the elements $n' - k'$ in case the spot zone $Z_1$ is selected. 21 is a register which is connected with the division means 20 so as to register the value obtained by the division means 20. The gate circuit 17, the addition means 18, the register 19, the division means 20 and the register 21 compose the spot light measuring system C.

15 is a division means which is controlled by means of the ROM device 5 in such a manner that the content of the register 14 is divided by the total number ($n'$) of the light sensing elements. 16 is a register which is connected with the division means 15, so as to register the value obtained by the division means 15. The addition means 13, the register 14, the division means 15 and the register 16 composes the mean light measuring system D.

22 is the comparison means which is connected with both registers 16 and 21 in such a manner that the content of the register 16 is compared with that of the register 21 in case by means of the ROM selecting switch the control content Ra and either one of $R_1 - R_5$ are selected at the same time whereby the gate circuit is brought in the switched on state in case there is an exposure difference greater than $\pm$ 2EV in the contents of both registers while the gate circuits 23 and 24 are connected so as to bring the gate circuit 23 in the switched on state in case there is an exposure difference smaller than $\pm$ 2EV in the content of both registers. 25 is the operation means which is connected with the output terminals of the gate circuit 23 and 24 in such a manner that the information signal of the light measurement from the gate circuit 23 or 24 is processed together with the logarithmically compressed digital signal of the exposure factors such as shutter time value 28, the diaphragm value 27, the ASA sensitivity and the like so as to control the diaphragm control device 30 or the shutter time control device 29 connected with the operation means 25, while at the same time, the operation means 25 is connected with the ratch 31 being controlled by the ROM device 5 in such a manner that the exposure information suited for the then photographing is indicated by the indication device E consisting of the decoder 32 and the indication member 33.

35 is the switching over switch for switching the diaphragm control device 30 over to the shutter control device 29 while 34 is the switching over switch for switching the shutter time value 28 over to the diaphragm value 27.

ROM selecting switch 4 is the selecting switch for selecting the control contents set in the ROM device 5. $R_1$ is one of the control contents set in the ROM device 5 whereby $R_1$ is intended to bring the gate circuit 17 in the switched on state while the light sensing elements $n' - k' \sim n'$ situated in the spot zone $Z_1$ are producing outputs, so as to carry out the spot light measurement in the spot zone $Z_1$. $R_2$ is one of the control contents set in the ROM device 5 whereby $R_2$ is intended to bring the gate circuit 17 in the switched on state while the light sensing elements $1' \sim n' - a'$ situated in the spot zone $Z_2$ shown in FIG. 1 are producing outputs, so as to carry out the spot light measurement in the spot zone $Z_2$. $R_3$ is one of the control contents set in the ROM device 5, whereby $R_3$ is intended to bring the gate circuit 17 in the switched on state while the light sensing elements $n' - b' \sim n' -c'$ situated in the spot zone $Z_3$ shown in FIG. 1 are producing outputs, so as to carry out the spot light measurement in the spot zone $Z_3$. $R_4$ is one of the control contents set in the ROM device 5, whereby $R_4$ is intended to bring the gate circuit 17 in the switched on state while the light sensing elements $n' - d' \sim n' - e'$ situated in the spot zone $Z_4$ shown in FIG. 1 are producing outputs, so as to carry out the spot light measurement in the spot zone $Z_4$. $R_5$ is one of the control contents set in the ROM device 5, whereby $R_5$ is intended to bring the gate circuit 17 in the switched on state while the light sensing elements $n' - f \sim n' - g'$ situated in the spot zone $Z_5$ shown in FIG. 1 are producing outputs, so as to carry out the spot light measurement in the spot zone $Z_5$. The control contents $R_1 - R_5$ are combined in such a manner that the comparison circuit 22 and the gate circuit 23 are out of operation while the gate circuit 24 is in operation when either one of the control contents $R_1 - R_5$ is selected by the ROM selecting switch 4.

$R_A$ is one of the control contents, whereby when only the control content $R_A$ is selected by the ROM selecting switch 4, the comparison circuit 22 and the gate circuit 24 are out of operation while the gate circuit 23 is in operation. When the control content $R_A$ and either one of the control contents $R_1 \propto R_5$ are selected at the same time by the ROM control switch 4, the comparison circuit 22 is in operation while the gate circuits 23 and 24 are controlled by the control signal of the comparison circuit 22.

Below the concrete control method will be explained at the time the outputs of the photo diodes are taken out one after another in case as an example of the image senser IS a photo diode array (MOS image senser) is adopted.

Figure 3B:
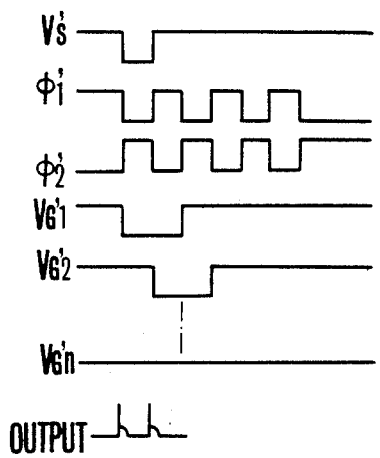
FIG. 3(b) shows the timing chart for showing the signal outputs taken out of the photo diodes one after another in the electrical circuit shown in FIG. 3(a).
Figure 3A:
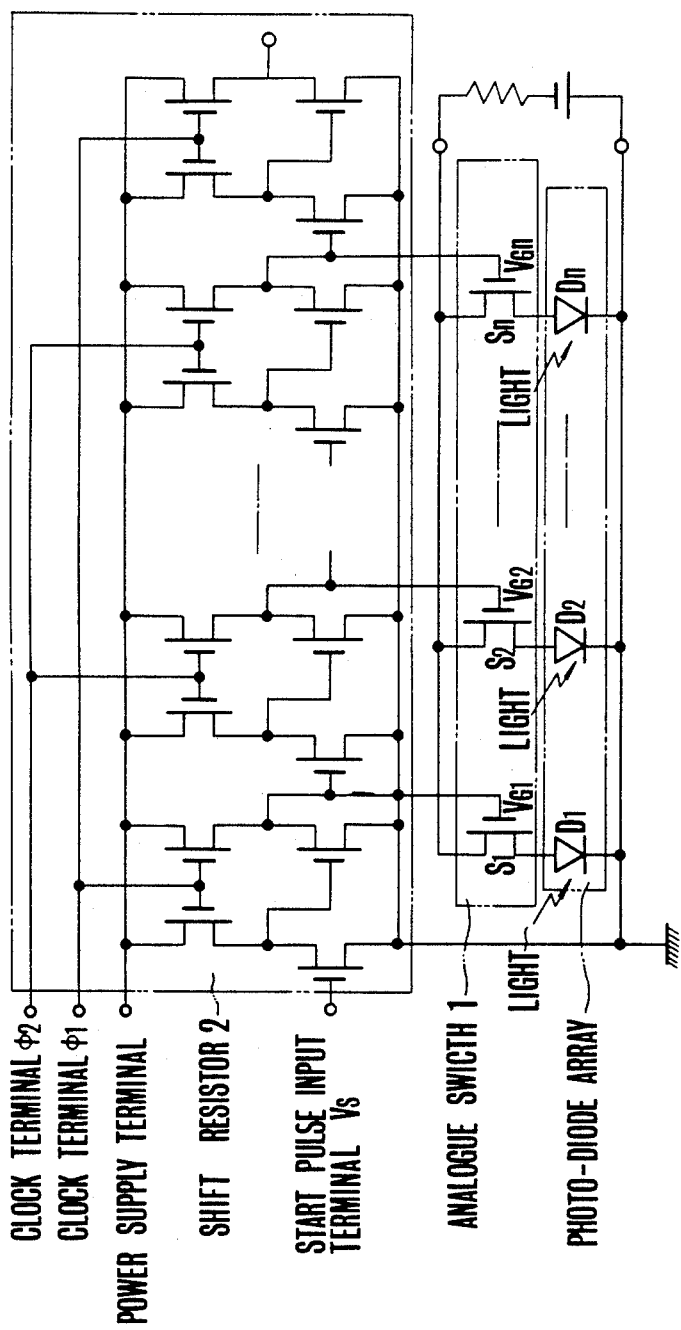
FIG. 3(a) shows an electrical circuit diagram of the electrical connection among the photo diode array, the analog switch 1 and the shift register 2 in case in the embodiment shown in FIG. 2 the photo diode array (MOS image senser) is adopted as image senser IS.

FIG. 3(a) shows an electrical circuit diagram of the electrical connection among the photo diode array, the analog switch 1 and the switch register 2 in case the photo diode array is adopted as image senser, while FIG. 3(b) shows the timing chart for showing the signal outputs taken out of the photo diodes one after another in the electrical circuit shown in FIG. 3(a).

When in FIG. 3(a) the start pulse Vs' as is shown in FIG. 3(b) is applied to the start pulse input terminal Vs in case the clock pulses $\phi_1'$, $\phi_2'$ as is shown in FIG. 3(b) is applied to the clock terminal $\phi_1$, $\phi_2$, a voltage as is shown by $VG_1'$ in FIG. 3(b) is applied to the gate $VG_1$ of the first switch $S_1$ of the analog 1 in such a manner that the photo diode $D_1$ produces an output corresponding to the light in the photographic field. After a half period of the clock pulse $\phi_1'$, $\phi_2'$ a voltage as is shown by $VG_2'$ in FIG. 3(b) is applied to the gate $VG_2$ of the second switch $S_2$ of the analog switch 1 in such a manner that the photo diode $D_2$ produces an output corresponding to the light of the photographic field. After another half period of the clock pulse $\phi_1'$, $\phi_2'$ the voltage $VG_1'$ applied to the gate $VG_1$ of the first switch $S_1$ is reset so as to open the switch $S_1$ and close the switch at the next step in such a manner that the photo diode connected with the switch at the next step produces an output. During the repetition of the above mentioned operations the photo diodes in the photo diodes array produce the output one after another.

Below the operation of the exposure measurement system in accordance with the present invention will be explained in accordance with FIGS. 1 and 2.

A system as operated by closing a current supply switch not shown. When the ROM selecting switch selects the control contents (members) $R_1$ and $R_4$, the signal from the ROM device 5 and the shift register 2 as well as the gate control circuit 3 cooperate to cause the first light sensing element 1' in the image sensor IS to transmit its output to the logarithmically compressing circuit A through the analog switch 1. The circuit A is composed of the operational amplifier 7 and the diode 6. The circuit A compresses its input signal logarithmically and applies to the comparison circuit 8. At the same time the ROM device 5 causes the clock pulse generator to produce clock pulses which are transmitted to the D-A converter 9. The clock pulses are also transmitted by the gate circuit 11 to the counter 12 so as to be counted in the counter.

The D-A converter 9 produces a signal $9_o$ in the form of staircase steps corresponding in number to the number of clock pulses. The comparator 8 compares the logarithmically compressed signal with the step signal $9_o$. When the values of both signal are equal to each other, the comparison circuit 8 produces a switching off or disabling signal. This disabling signal appears at the gate circuit 11 and switches off or disables the gate circuit 11. This prevents the clock pulse from being transmitted to the counter 12 while the digital signal corresponding to the output of the light sensing element 1' is counted by the counter 12.

When the counter finishes the counting, the control signal of the ROM device 5 causes the digital signal counted by the counter 12 to be transmitted to the register 14 in the mean light measuring system D through the addition means 13 so as to be registered there.

When the register 14 has registered the digital signal, the control signal by the ROM device 5 is transmitted to the gate control circuit 3, whereby the output of the light sensing element 2' is processed likely to the output of the light sensing element 1', so as to be counted and then added to the digital signal corresponding to the output registered in the register 14, of the light sensing element 1' by the addition means 13 in such a manner that the sum of the digital signals corresponding to the light sensing elements 1' and 2' is registered in the register 14.

Thus the output signals corresponding to the conditions of the photographic field, if the light sensing elements down to the element $3' \sim n'$ are added as digital signals one after another in the register 14 so as to be registered there in such a manner that in the register 14 the total sum of the digital signals corresponding to the output signals of all the light sensing elements $1' \sim n'$ in the image senser IS shown in FIG. 1 is registered. In short the light sensing elements are arranged all over the image plane as is shown in FIG. 1, so that in the register 14 a value $n'$ times as large as the mean light measurement value is registered.

When as mentioned above, the total sum of the digital signals corresponding to the output of the light sensing elements $1' \sim n'$ is registered in the register 14 has been registered in the register 14, the total sum of the digital signals is transmittted by the ROM device 5 to the division means 15 so as to be divided by the number ($n'$) of all the light sensing elements and registered in the register 16 as the mean light measurement value.

When hereby as mentioned above the output of the light sensing element $n' - k'$ is processed during the light measuring process the control signal from the ROM device 5 is transmitted to the gate circuit 17 through the gate control circuit 3, so as to open the gate circuit 17, whereby the digital signal counted by the counter 12, of the output of the light sensing element $n' - k'$ is transmitted to the mean light measuring system D and at the same time to the addition means 18 of the spot light measuring system C in such a manner that likely to the above mentioned operation of the mean light measuring system D the total sum of the digital signals corresponding to the outputs of the light sensing elements down to the element $n' - k' \sim n'$ is registered in the register 19. When the total sum of the digital signals corresponding to the outputs of the light sensing elements down to the element $n' - k' \sim n'$ has been registered in the register 19, the division means 20 is put in the operation by means of the ROM device 5 in such a manner that the total sum of the information signals $n' - k' \sim n'$ is divided by the number of the light sensing elements situated in the spot zone $Z_1$ so as to be registered in the register 21.

As is shown in FIG. 1, the light sensing elements $n' - k' \sim n'$ are arranged so as to measure the brightness of a part in the middle of the image plane in the spot zone $Z_1$ so that the value of the spot light measurement in the part in the middle is registered in the register 21.

The value registered in the register 21, of the spot light measurement and the value registered in the register 16, of the mean light measurement are transmitted by means of the signal from the ROM device 5 to the comparison circuit 22 so as to be compared with each other in such a manner that when the difference between the exposure values more than ± 2EV is detected between both values the switching on signal of the comparison circuit 22 is transmitted to the gate circuit 24, so as to close the gate circuit 24 and to transmit the value registered in the register 21, of the spot light measurement to the processing means 25 through the gate circuit 24, while when the difference between the exposure values is smaller than ± 2EV the comparison circuit 22 transmits the switching on signal to the gate circuit 23 so as to close the gate circuit 23 in such a manner that the value registered in the register 16, of the mean light measurement is transmitted to the processing means 25 through the gate circuit 23. The value of the spot light measurement or the value of the mean light measurement transmitted to the processing means 25 is logarithmically compressed in accordance with the connected state of the switch 34 and processed together with the digital value of the shutter time 28 or the diaphragm 27 and the ASA sensitivity 26 so as to be transmitted as control signal for controlling the diaphragm control device 30 or the shutter time control device 29 selectively to the device 29 or 30 in accordance with the connected state of the switch 35 in functional engagement with the switch 34 and at the same time to the indication device E consisting of the ratch 31, the decoder 32 and the indication member 33 to indicate the shutter time value or the diaphragm value. Hereby the switches 34 and 35 shown in FIG. 2 are in the state in which the diaphragm value is controlled.

The above mentioned process corresponds with the case in which the control contents $R_A$ and $R_1$ are selected at the same time by the ROM selecting switch 4, whereby when it is desired in accordance with the condition of the photographic field that the value of the spot light measurement at the left upper part in the image plane of the object to be photographed is compared with the value of the mean light measurement it is sufficient to select the control contents $R_A$ and $R_2$ at the same time by means of the ROM selecting switch 4.

When in case of only the spot light measurement the control content corresponding to the desired spot zone (for example spot zone $Z_1$) in the image plane of the object to be photographed is selected by means of the ROM selecting switch 4, the value of the spot light measurement in the spot zone $Z_1$ is registered in the register 21. As hereby only the control content $R_1$ is selected, the comparison circuit 22 and the gate circuit 23 are out of operation and only the gate circuit 24 is in operation in such a manner that the value registered in the register 21, of the spot light measurement in the spot zone $Z_1$ is transmitted to the processing means 25 through the gate circuit 24, so as to be controlled similarly to the case when $R_A$ and $R_2$ are selected.

When in case of only the mean light measurement only the control content $R_A$ is selected by means of the ROM selecting switch 4 the gate circuit 17 is not switched on in such a manner that the spot light measuring system C, the comparison circuit 22 and the gate circuit 24 and out of operation while the gate circuit 23 is in operation so that the value of the mean light measurement is registered in the register 16 due to the operation similar to the above mentioned process and transmitted to the processing means 25 through the gate circuit 23 so as to be controlled similarly to the case when the control contents $R_A$ and $R_1$ are selected.

FIG. 4 shows an embodiment practically built in the ordinary camera, of the above mentioned exposure measuring system in accordance with the present invention. The camera shown in the drawing is a conventional single reflex camera whereby in the drawing only the important parts are shown for the sake of simplicity.

In the drawing $L_1$ is the conventional photographic optics while 36 is the pentagonal prism composing the view finder optics of the camera whereby the image senser IS is cemented on the semipermeable face 36a of the pentagonal prism 36 or provided in its neighborhood. 37 is the conventional photographic diaphragm blade provided in the photographic optical path whereby the diameter of the opening is controlled by means of the above mentioned diaphragm control device 30, which is shown in dotted line 30' in the drawing. 38 is the opening and closing member of the conventional focal-plane-shutter whereby the opening and the closing speed is controlled by means of the shutter time control device, which is shown in the dotted line 29' in the drawing. 39 is the film, while F is a circuit block including circuits 1 to 3 and 5 to 25 in FIG. 2.

When this camera is used, the switch 34 and the switch 35 is functional engagement with the switch 34 is operated depending upon whether the automatic control of the diaphragm (the so called automatic diaphragm control method with priority on the shutter time) or the automatic control of the diaphragm (the so called automatic shutter time control method with priority on the diaphragm) is desired (The state shown in the drawing corresponds to the automatic shutter time control method with priority on the diaphragm), whereby further the desired light measurement is decided by means of the ROM selecting switch 4 as mentioned above. Then the ASA sensitivity 26 is decided in accordance with the sensitivity of the film 39 to be used while either the diaphragm value 27 or the shutter time value 28 is decided in advance in accordance with the method for controlling the exposure. (In the state shown in the drawing the shutter time value 28 is decided in advance because it is intended to control the diaphragm automatically).

When after the above mentioned operation, the current source switch not shown in the drawing is closed the exposure measurement system is brought into operation likely to the case explained in accordance with FIG. 1, whereby the exposure value then suited for the photographic field, namely the shutter time value in case of the automatic shutter time control or the diaphragm value in case of the automatic diaphragm control (In consequence the diaphragm value in the state shown in the drawing.) is indicated by the indication device E in the view finder of the camera while either the shutter time control device 29 or the diaphragm control device 30 operates in such a manner that the operating speed of the shutter operating member 38 or the opening diameter of the diaphragm blade 37 is automatically controlled so as to carry out the automatic exposure control in accordance with the then condition of the photographic field. Hereby in the state shown in the drawing, the diaphragm control device 30 operates so as to control the opening diameter of the diaphragm blade 37.

Thus, it is possible to take a photograph with the exposure value suited for the then condition of the photographic field by operating the conventional release button not shown in the drawing in the above mentioned state.

In this way both the automatic exposure control with priority on the shutter time and that with priority on the diaphragm are possible in case of the exposure measurement system in accordance with the present invention.

Especially in case of the exposure measurement in accordance with the present invention as light sensing means an image senser consisting of a number of fine light sensing elements such as MOS image senser, CCD (Charge coupled devices) and so on is adopted whereby by arranging each light sensing element in the image senser at the position corresponding to each fine part of the image plane of the object to be photographed and by scanning the image plane of the object to be photographed purely electrically by means of the light sensing elements the brightness at each part corresponding to each light sensing element, of the object to be photographed is measured whereby a desired light measurement is carried out by converting the output of each light sensing element into digital value and selectively taking out the digital signal so that the most suited light measurement is automatically selected, which brings many profits to this kind of the light measurement, such as capability for spot light measurement over a wide range of the image plane of the object to be photographed, for automatically selecting the light measurement most suited for the then photographing conditions.

Hereby it goes without saying that it is possible to design the present embodiment in such a manner that the shutter time control device 29 and the diaphragm control device 30 are eliminated and the shutter time or the diaphragm is manually controlled in accordance with the exposure value indicated by the indication device E. Further it is possible to provide only the shutter time control device 29 or the diaphragm control device 30.

Below the focus point detecting system for detecting the focus point of the image forming optics by means of the image senser in accordance with the present invention will be explained in accordance with an embodiment shown in FIGS. 5 to 9, whereby the system is applied to the ordinary camera.

FIG. 5(a) shows the image senser suited for the focus point detecting system in accordance with the present invention while FIG. 5(b) shows a part thereof in enlargement, whereby the image senser IS' is composed in such a manner that as is shown in the drawing $n$ fine light sensing elements with same dimension $P_1$, $P_2$, $P_3$... $P_{n-1}$, $P_n$ are arranged in form of matrix on the base plate G.

The image senser IS' is placed at the position equivalent to the film H relative to the photographic optical system L of the camera as is generally shown in FIG. 6(a). HM is a small semipermeable mirror provided slantwise on the optical axis of the photographic optical system L between the photographic optical system L and the film H, which small semipermeable mirror reflects the light beam at the control part of the light beam coming from the object to be photographed through the photographic optical system L so as to be projected on the image senser IS'. In consequence, the image senser IS' receives only the light beam at the central part H'a in the image plane H' to be projected on the film H, of the object to be photographed as is shown in FIG. 6(b).

Figure 7:
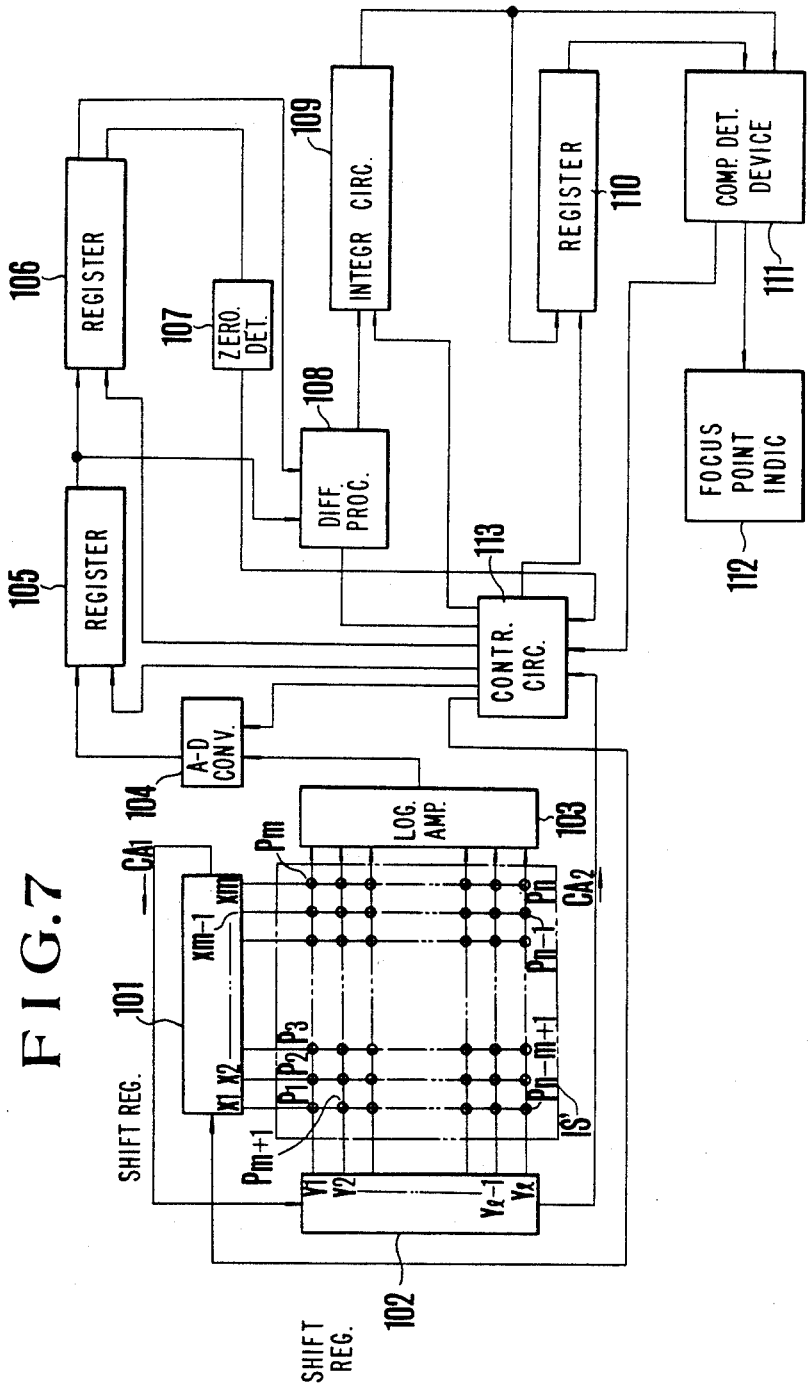
FIG. 7 shows the electric block circuit diagram of an embodiment of an ordinary camera in which the focus point detecting system using the image senser IS' shown in FIG. 5 (a) and (b) in accordance with the present invention is adopted.

FIG. 7 shows the block wiring diagram of the electrical circuit of an embodiment of the focus point detecting system in accordance with the present invention, utilizing the image senser IS' as is shown in FIG. 5(a) and (b), whereby 101 is the X-coordinate shift register presenting $m$ X-coodinate axis $X_1$, $X_2$, ... $X_{m-1}$, $X_m$ while 102 is the Y-coodinate shift register presenting $lY$-coodinate axis $Y_1$, $Y_2$, ... $Y_{l-1}$, $Y_l$ (hereby $l = n/m$) and a matrix is formed by these X and Y coodinate axis. The light sensing elements $P_1$, $P_2$, ... $P_n$ in the image senser IS' are positioned one after another relative the matrix so as to be connected with both X and Y coodinate shift register 101 and 102. 103 is the logarithmic amplifier for logarithmically compressing the output of each light sensing element $P_1$, $P_2$, ... Pn, 104 the A - D converter for converting the analog amount into digital value, both 105 and 106 the registers and 107 the zero detecting circuit of the register 106. 108 is the circuit for processing the absolute value of the difference between the outputs of the registers 105 and 106, whereby when for example, it is assumed that the content of the register 106 be $\alpha$ while the content of th register 105 be $\beta$, the value $|\alpha - \beta|$ is produced. 109 is the integrating circuit, 110 the register, 111 the comparison detecting device for comparing the output of the register 110 with the output value of the integrating circuit 109 and 112 the driving source respectively the combined focus point indication device of the photographic optical system. 113 is the control circuit for central-controlling the circuit and the device shown with 101 and 104 respectively 110.

Below the operation of the focus point detecting system composed as above will be explained.

When the system is brought into operation by switching on the current source not shown in the drawing, $X_1$ and $Y_1$ axis of the shift registers 101 and 102 are switched on at first and in consequence the output of the light sensing element $P_1$ at the coodinate $(X_1, Y_1)$ is put in the logarithmical amplifier 103. After the analog output logarithmically compressed by the logarithmic amplifier 103, of the light sensing element $P_1$ is converted into a digital value $R_1$ by means of the A - D converting device 104, the value $R_1$ is registered in the register 105. When at this time, other signal is registered in the register 106, the the absolute value of the difference between the signals registered in the registers 105 and 106 is immediately processed, whereby however, no signal has been registered in the register 106 and therefore the processing circuit 108 is not brought into operation by the control circuit 113 with the signal from the zero detecting circuit 107. Then by means of the signal from the control circuit 113 the digital value $r_1$ registered in the register 105, of the output of the light sensing element $P_1$ is transferred to the register 106, while the coodinate axis of the shift register 101 is shifted by one step in such a manner that the $X_1$ axis is switched over from the switched on state to the switched off state while the $X_2$ axis is switched over from the switched off state to the switched on state, so that now the output of the light sensing element $P_2$ positioned at the coordinate $(X_2, Y_1)$ is registered as digital value in the register 105 through the logarithmic amplifier 103 and the A - D converting device similarly to the case of $P_1$. When signals are registered in the registers 105 and 106, the control circuit 113 immediately brings the processing circuit 108 into operation, so as to process the absolute value of the difference between the signals registered in the register 105 and 106, namely $|R_1 - r_2|$ and tranfers the obtained digital value to the integrating circuit 109 while the signal registered in the register 105 is transferred to the register 106. When then by means of the signal from the control circuit 113 the coodinate axis of the shift register is further shifted by one step, the output signal of the light sensing element $P_3$ at the coodinate $(X_3, Y_1)$ is converted into an output $r_3$ after the same process as before, the value $|r_2 - r_3|$ is processed in the processing circuit 108 and then transferred to the integrating circuit 109 so as to be added to the former value $|r_1 - r_2|$. When after repetition of the same process the shifting is finished up to the coodinate axis $X_m$ of the shift register 101 (namely when the output signal of the light sensing element $P_m$ at the coodinate $(X_m, Y_1)$ has been processed), the shift register 101 give an output signal $CA_1$ to the shift register 102 in such a manner that the coodinate axis of the shift register 102 is shifted similarly to the case of the shift register 101. In this way, then the output signal of the light sensing element $P_{m+1}$ at the coodinate $(X_1, Y_2)$ is processed. When after repetition of the same process the output signal is processed up to the last light sensing element $P_n$ at the coodinate $(X_m, Y_l)$, the shift register 102 gives an output signal $CA_2$ to the control circuit 113. The value processed by the integrating circuit 109 at this time is $$\sum_{k=2}^{n} |r_{k-1} - r_k|,$$

namely the total sum of the absolute values of the differences between the outputs of each pair of the light sensing elements $P_1 \sim P_n$ in the image senser IS' whereby the outputs are logarithmically compressed, amplified and then converted into digital values. Immediately upon receiving a signal $CA_2$ from the shift register 102 the control circuit 113 makes the comparison device 111 compare the value processed by the integrating circuit 109 with the signal (at this time zero) registered in the register 110. After repetition of the same operation the variation of the value $\Sigma$ processed by the integrating circuit 109 is detected by scanning different image planes by the light sensing elements $P_1$, $P_2$, ... $P_n$. Namely, when while the photographic optical system L shown in FIG. 6(a) is moved from the position of focus at infinitive to that at the nearest distance, the signals are processed as mentioned above, the value $\Sigma$ processed by the integrating circuit 109 at this time varies as is shown in FIG. 8 in such a manner that the value is the largest at the focussing position. This is due to the fact that when the photographic optical system L reaches the focussing position the image in the image senser IS' of the object to be photographed becomes most sharp and therefore the then difference between the outputs of the two adjacent light sensing elements in the image senser IS' becomes largest. Namely, when the photographic optical system is approaching the focussing position the value Σ increases, when the system is at the focussing position the value Σ is largest and when the system is leaving the focussing point the value Σ decreases. Namely it is possible to find out the focussing point by comparing the value Σ processed by the integrating circuit 109 withe the next value Σ one after another by means of the comparison circuit 111 so as to detect the point of inflexion of the curve shown in FIG. 8.

When the first process has been completed from the output signal of the light sensing element $P_1$ to the output signal of the light sensing element $P_n$, the value processed by the integrating circuit 109 is registered in the register 110. On the other hand at this time, the $X_1$ axis in the shift register 1 and the $Y_1$ axis in the shift register 2 are respectively switched on, whereby by means of the signal from the control circuit 113, the second process begins from the output signal of the light sensing element $P_1$ to the output signal of the light sensing element $P_n$. Let the digital values of the outputs of the light sensing elements $P_1, P_2, \ldots P_n$ be $r'_1, r'_2, \ldots r'_n$, the total sum of the values processed by the integrating circuit 109 can be expressed by $$\sum_{k=2}^{n} |r'_{k-1} - r'_k|$$

likely to the former case. As soon as the second process by means of the integrating circuit 109 has been completed the control circuit 113 makes the commparison detecting device 111 compare the value processed by the integrating circuit 109

$$(\sum_{k=2}^{n} |r'_{k-1} - r'_k|)$$

with the value registered in the register 110

$$(\sum_{k=2}^{n} |r_{k-1} - r_k|).$$

when at this time, "the value registered in the register 110" is smaller than "the value processed by the integrating circuit 109", namely $$\sum_{k=2}^{n} |r_{k-1} - r_k| < \sum_{k=2}^{n} |r'_{k-1} - r'_k|,$$

the same process is repeated until the value registered in the register 110 becomes larger than the value processed by the integrating circuit 109, when the comparison detecting device 111 gives a focussing signal to the control circuit 113. By means of this signal, the control circuit 113 stops the scanning of the image plane by means of the light sensing elements $P_1, P_2, \ldots P_n$, at the same time sending the focussing signal to the driving source of the photographic optical system L respectively the focus point indication device 112, so as to stop the photographic optical system L at the focussing position respectively to indicate the focus point.

Further, in the present embodiment the output of each light sensing elements in the image sensor IS' is logarithmicallly compressed, amplified and then converted into a digital value whereby it goes without saying that the output to each light sensing element can directly converted into a digital value without being logarithmically compressed and amplified. However, in case the output of each light sensing element is logarithmically compressed and amplified, the noise in the scanning signal can be kept as small as possible even if the brightness of the object to be photographed to some extent during the scanning of the image pattern of the object to be photographed by means of the light sensing elements and therefore the erroneous operation of the focus point detecting device can be avoided.

Figure 5:
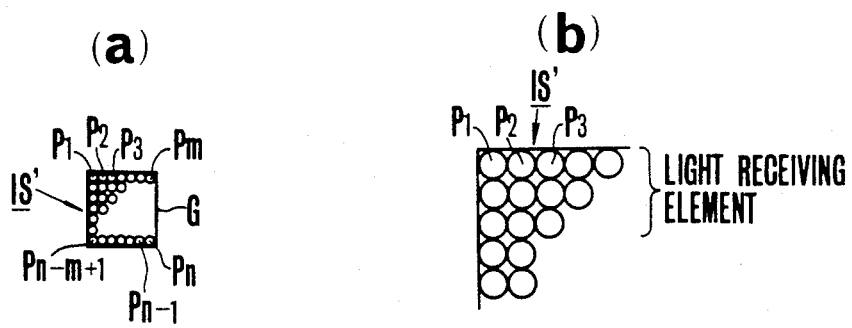
FIG. 5(a) shows an embodiment of the arrangement of the light sensing elements of the image senser suited for the focus detecting system according to the present invention.
FIG. 5(b) shows a part of the image senser IS' shown in FIG. 5(a) in enlargement.
Figure 6:
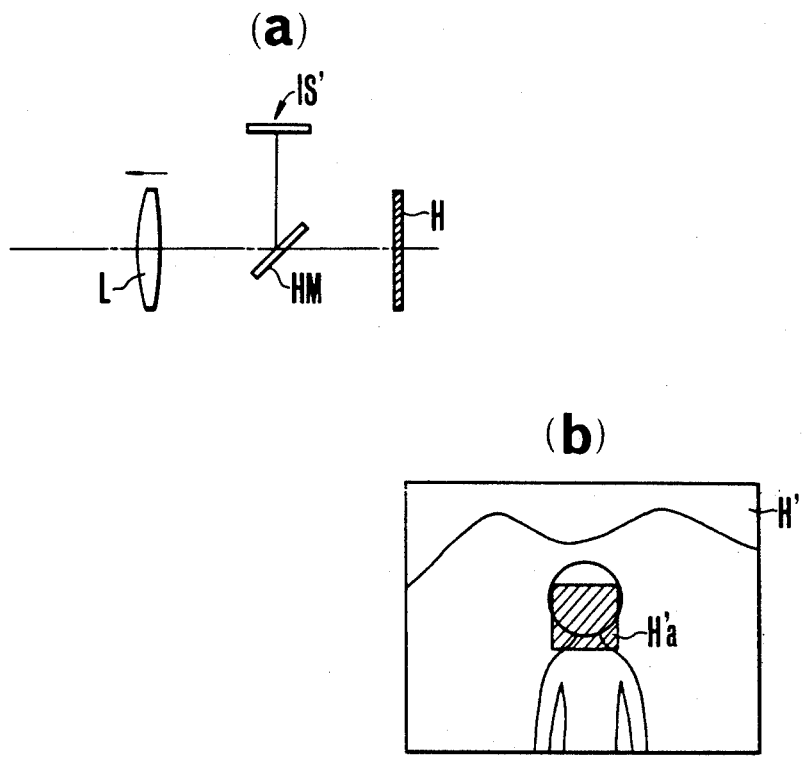
FIG. 6(a) shows a principal arrangement of the important parts in case the focus detecting system according to the present invention is applied for an ordinary camera.
FIG. 6(b) shows the relation between the light sensing area of the image senser IS' and the image plane of the object in the arrangement shown in FIG. 6(a).

As the image senser capable of being utilized in the focus point detecting system in accordance with the present invention, apart from the image senser presenting an arrangement pattern of the light sensing elements as shown in FIG. 5 (a) and (b), the image senser IS' presenting an arrangement pattern of the light sensing elements as shown in FIG. 1 can also serve whereby various variation of the arrangement pattern of the light sensing elements are possible.

An embodiment of the focus point detecting system in accordance with the present invention, mentioned above and practically built in the ordinary camera is shown generally in FIG. 9. The camera in the drawing is a conventional motion picture camera, whereby only the important parts are shown.

In the drawing, among the photo-lens groups $L_2$, $L_3$ and $L_4$, the first and the second lens group $L_2$ and $L_3$ are utilized in common as an objective lens for range detecting. Hereby the lens group $L_2$ is kept by a lens barrel 114 presenting a rack 114a and moved along its optical axis by means of the rotations of the motor 112a through a gear 115 fixed to the rotational shaft 112a' of the motor. Between the lens group $L_3$ and the lens group $L_4$ a light beam splitter 116 presenting two semi-permeable mirrors 116a and 116b is disposed. A lens group $L_5$, a reflecting prism 117 and a lens group $L_6$ compose a view finder optical system. The semi-permeable mirror 116a is disposed slantly to the optical axis so that the light beam coming from the lens group $L_3$ to the film H may be split toward the view finder optical system. In the optical path toward the view finder optical system from the mirror 116a is disposed another semi-permeable mirror 116a so that the light beam may be further split into an image reforming lens 118.

The image senser IS' is disposed behind this image reforming lens 118 and at a position equivalent to that of the film H relative to the lens groups $L_2$ and $L_3$.

112b is the indication device disposed in the view finder optical path in such a manner that the indication can be recognized in the view finder of the camera, J the circuit block including elements shown with 101 to 111 and 113 in FIG. 7, whereby the indication device 112b is connected with the output terminal of the circuit block J together with the motor 112a. Namely, the motor 112a and the indication device 112b correspond to the block 112 in FIG. 7.

121 is a spring disposed between the lens barrel 114 and the camera body by means of which spring the lens barrel 114 is forced to the right in the drawing namely in such a manner that the lens group L$_2$ is normally kept at the focus position at infinitive distance.

119 and 120 are the shutter and the diaphragm in the conventional motion picture camera, 122 a two step release button so constructed that the focus detecting system is actuated at the first step while the shutter is actuated at the second step.

When the motion picture camera constructed as mentioned above is directed toward the desired object to be photographed and the release button is pushed down to the first step, the circuit block J is brought into operation and the focus detecting operation of the photographic optical system begins. Namely, the image pattern of the object to be photographed is scanned by means of the image senser IS', whereby by means of the output given from the circuit block due to the above scanning signal the motor 112a runs along the direction of the arrow in the drawing in such a manner that the lens group L$_2$ is advanced from the focus position at infinitive distance along the direction of the arrow in the drawing against the strength of the spring 121. When the lens group L$_2$ reaches the focussing position of the object to be photographed during the advance movement the image of the object to be photographed becomes sharpest on the image senser IS', when by means of the scanning signal of the image senser IS'the circuit block J immediately stops the motor 112a, so as to keep the lens group L$_2$ at this focussing position, at the same time, actuating the indication device 112b so as to indicate that the lens group L$_2$ is at the focussing position. In this state, the image of the object to be photographed is sharpest on the film H.

Consequently, when in this state the release button 122 is pushed down to the second step the shutter 119 is operated so as to expose the film H on which the sharpest image of the object to be photographed is obtained.

Further, when the release button 122 is freed, the current supply to the circuit block J is interrupted so that the lens group L$_2$ is automatically returned to the focus position at infinitive distance by means of the spring 121.

As explained above, in case of the focus point detecting system in accordance with the present invention the image pattern of the object to be photographed is scanned purely electrically, whereby the mechanical scanning device in the conventional system is not necessary, so that the focus point detecting device can easily be made compact in accordance with the present invention, which is quite profitable for small optical instrument such as camera. Further in case of the focus point detecting system in accordance with the present invention the output of each light sensing element is processed after being converted into digital value, so that the electrical processing is remarkably easy as compared with the conventional system processing analog amount while at the same time, the accuracy of the focus point detection can extremely increased as compared with the conventional system. Further in case of the focus point detecting system in accordance with the present invention, the image pattern of the object to be photographed can be scanned at a very high speed so that an exact focussing signal can be obtained.

Hereby, it goes without saying that the driving source shown symbolically with the motor 112a (in FIG. 9), for the automatic focus adjustment of the optical system can be eliminated in such a manner that the focus adjustment of the optical system is manually carried out by the focus point indication device.

Further, it goes without saying that the focus point detecting device or the automatic focus point adjusting device in accordance with the present invention can be embodied as the device to be built in the optical instruments such as camera or the independent device to be used with the optical instrument. Hereby in case of the independent device a distance measuring device can easily be obtained when the focus point indication point, indication device in the embodiment is exchanged for the distance indicator.

Below an embodiment of the system for exposure measurement as well as for focus point detection by means of a common image senser in accordance with the present invention will be explained in accordance with the FIGS. 10 and 11, whereby the system is applied to the general camera.

FIG. 10 is a block wiring diagram for the electric circuit of an embodiment of the system capable of exposure measurement as well as the focus point detection of the optical system by means of a common image senser.

In case of the embodiment of the system shown in FIG. 10, not only the image sense IS shown in FIG. 1 as well as the image senser IS' shown in FIG. 5(a) and (b), but also the image senser presenting other arrangement pattern of the light sensing elements can be utilized. However, hereby the case in which the image senser IS shown in FIG. 1 will be explained.

In the drawing, 201 is the shift register, 202 the analog switch being connected with each light sensing element, 203 the logarithmic amplifier for logarithmically compressing and amplifying the output of each light sensing element in the image senser IS, 204 the A-D converter for converting each output of the logarithmic amplifier into the digital value, 205 and 207 the registers and 206, 209, 212 and 213 the gate circuits. 208 is the processing circuit for processing the absolute value of the difference between two signal values registered in the registers 205 and 207, 210 the addition means for adding the value processed by the processing circuit 208 to the signal value registered in the register 211, 214 and 215 the registers, 216 the comparison detecting device for comparing the signal value registered in the register 211 with that registered in the register 215, 217 the driving source of the photographic optical system and 217' the focus point indication device. 218 is the deviding circuit for deviding the signal value registered in the register 211, 219 the processing means for logarithmically compressing, amplifying and processing the output of the deviding circuit 218 together with the shutter time value Tv respectively the diaphragm value Av converted in a digital value and the film sensitivity value Sv in order to obtain the exposure value, 220 the diaphragm control device, 220' the shutter time control device, 220" the exposure value indication device, 221 device, the control circuit for controlling the whole system and 222 the switching over switch for switching the one exposure control system over into the other system.

The image senser IS is placed at the image forming position or at a position equivalent to the image forming position of the photographic optical system not shown in the drawing or of the image forming position of the image forming optical system for the image senser IS.

In the above mentioned composition the focus point detecting system consists of IS and the element 201 to 208, 210, 211 and 213 to 216 while the exposure measuring system consists of IS and the elements 201 to 205, 209 to 212, 218 and 219.

Below the operation of the above mentioned system will be explained.

In order to detect the focus point of the optical system the current switch not shown in the drawing is closed to operate the system, whereby by means of the control signal produced in the control circuit 221 the gate circuits 206 and 213 are brought into the switched on state (hereby the gate circuit 209 and 212 are kept in the switched off state), while the shift operator 201 starts to operate. In the analog switch 202 the switching element corresponding to each of the light sensing elements $1', 2', \ldots n'$ in the image senser IS is provided in such a manner that there switching elements operate one after another when the shift register 201 is shifted by one step. When at first by means of the shift register 201 the first switching element corresponding the light sensing element $1'$, in the analog switch 202, the output of the light sensing element $1'$ is transferred to the logarithmic amplifier 203 through the analog switch 202 so as to be logarithmically compressed and amplified. The analog amount of the output of the light sensing element $1'$ logarithmically compressed and amplified by the logarithmic amplifier 203 is converted into a digital value $P_1$ by means of the A - D converting device 204 and then registered in the register 205. If at this time, a signal value were registered in the registere 207, the control circuit 221 immediately should send a control signal to the processing circuit 208, so that the processing circuit 208 might process the absolute value of the difference between the signal values registered in both registers 205 and 207.

However, at this time no signal value is registered in the register 207, so that the control circuit 221 does not bring the processing circuit 208 into operation. Then by means of the control signal produced by the control circuit 221 the signal value registered in the register 205, namely the digital value of the output of the light sensing element $1'$ logarithmically compressed and amplified is registered in the register 207 through the gate circuit 206, while at the same time, the shift register 201 is shifted by one step. Thus the first switching element corresponding to the light sensing element $1'$, of the analog switch 202 is brought into switched off state, while the second switching element corresponding to the light sensing element $2'$ is brought into switch on state, so that likely to the case of the output of the light sensing element $1'$, the output of the light sensing element $2'$ is processed and registered in the register 205 as signal value $P_2$. When a signal value is registered in the register 205, the control circuit 221 sends a control signal to the processing circuit 208, so as to process the absolute value of the difference between the signal values registered in the registers 205 and 207. Therefore, the then value processed by the processing circuit can be expressed in $|P_1 - P_2|$. The value processed by the processing circuit 208 is added to the signal value registered in the register 211 (the signal value registered in the register 211 is zero) by means of the addition means 210 and registered in the register 211 (therefore the value registered in the register 211 at this time is $|P_1 - P_2|$). Then by means of the signal value registered in the register 205 comes to be registered in the register 207 through the gate circuit 206 (namely in the register 207 the signal value $P_2$ of the output of the light sensing element $2'$ is registered in place of the signal value $P_1$ of the output of the light sensing element $1'$), whereby likely to the above mentioned case, by means of the control signal produced by the control circuit 221 the shift register 201 is shifted further by one step in such a manner that the output of the light sensing element $3'$ is processed likely to the above mentioned two cases so as to be registered in the register 205 as signal value $P_3$. When a signal value is registered in the register 205, the control circuit 221 actuates the processing circuit 208, so as to carry out the same process as mentioned above. Thus the then value processed by the processing circuit 208 is $|P_2 - P_3|$, which value is added to the then value $|P_1 - P_2|$ registered in the register 211 and then registered in the register 211. In consequence the then value registered in the register 211 is $|P_1 - P_2| + |P_2 - P_3|$. The same process is repeated until the output of the light sensing element $n'$ has been processed. The value registered in the register 211 when all the output of the light sensing elements down to $n'$ is $$\sum_{k=2}^{n} |P_{k-1} - P_k|,$$

namely the total sum of the absolute values of the differences of the outputs between two adjacent light sensing elements in the image senser IS, whereby the output of each light sensing element is logarithmically compressed and converted into a digital value. The then value registered in the register 211

$$\sum_{k=2}^{n} |P_{k-1} - P_k|$$

is immediately registered in the register 214 through the gate circuit 213 by means of the control signal produced by the control circuit 221. The value registered in the register 214 is compared with the signal value registered in the register 215 by means of the comparison detecting device 216. Namely, the then value registered in the register 215 is zero and further $$\sum_{k=2}^{n} |P_{k-1} - P_k|$$

is larger than zero so that the value registered in the register 214 is larger than the value registered in the register 215.

In this way, the variation of the value $\Sigma$ processed by the addition means 210 and registered in the register 211 is detected by scanning the image plane by means of the light sensing elements $1', 2', \ldots n'$ and repeating the above mentioned process. Namely, when the signals are processed as mentioned above, while the image forming optical system not shown in the drawing, for the image senser IS is moved for example, from the focus point at infinite distance to the focus point at the nearest distance, the value processed by the addition means 210 and registered in the register 214 $\Sigma$ varies as is shown in FIG. 8 likely to the case of the focus point detecting system shown in FIG. 7, whereby the value becomes largest at the focussing position. Namely, when the image forming optical system approaches the focussing position, the value $\Sigma$ increases, when the image forming optical system is at the focussing position, the value $\Sigma$ is largest and when the image forming system leaves the focussing position the value $\Sigma$ decreases. Consequently, it is possible to obtain the focussing point when the maximum value of the $\Sigma$ namely, the inflection point of the curve shown in FIG. 8 is detected by comparing the value $\Sigma$ with the next value $\Sigma$ processed by the addition means 210 and registered in the register 214 one after another.

Because the scanning signal namely $$\sum_{k=2}^{n} |P_{k-1} - P_k|$$

obtained at the first scanning of the image of the object to be photographed by means of the light sensing elements 1', 2', ... n' is larger than the then value registered in the register 215, the control circuit 221 produces a control signal so that the value registered in the register 214 is transferred to the register 215 while the shift register 201 is reset in such a manner that the second scanning of the image of the object to be photographed started by moving the image forming optical system not shown in the drawing. Thus, let the digital values of the outputs of the light sensing element $P'_1$, $P'_2$, ... $P'_n$, so the total sum of the value processed by the addition means 210 and registered in the register 214 can be expressed in $$\sum_{k=2}^{n} |P_{k-1} - P_k|$$

likely to the former case. As soon as a new signal value is registered in the register 214, the control circuit 221 brings the comparison detecting means 216 into operation so as to compare the signal value registered in the register 214 with that registered in the register 215, whereby when at this time "the value registered in the register 214" is larger than "the value registered in the register 215" (namely in this case $$\sum_{k=2}^{n} |P_{k-1} - P_k| > \sum_{k=2}^{n} |P_{k-1} - P_k|)$$

the scanning of the image of the object to be photographed is continued until the value registered in the register 214 is smaller than the value registered in the register 215

(namely $\sum_{k=2}^{n} |P_{k-1} - P_k| > \sum_{k=2}^{n} |P_{k-1} - P_k|$), when the comparison detecting means 216 sends a signal to the control circuit 221. Hereby the fact that the value registered in the register 214 becomes smaller than the value registered in the register 215 means that the value Σ processed by the addition means 210 and registered in the register 214 reaches the maximum, namely the highest point in the drawing shown in FIG. 8, namely the photographic optical system not shown in the drawing reaches the focussing point. Consequently, the signal produced by the comparison detecting means 216 is the focussing signal. By means of this focussing signal the control circuit 221 immediately the scanning of the image of the object to be photographed by means of the light sensing elements 1', 2', ... n', at the same time sending a control signal to the driving source 217 of the photographic optical system and the focus point indication means 217' so as to stop the driving means of the photographic optical system and indicate that the focussing position has been obtained. Hereby it is also possible to eliminate the driving source 217 whereby the focus position of the photographic optical system can be obtained by adjusting the photographic optical system by means of the focus point indication device 217'.

Below the operation at the exposure measurement will be explained. When the focus adjustment of the photographic optical system has been completed the control circuit 221 produces a control signal in such a manner that the gate circuits 209 and 212 are switched from the switched off state over into the switched on state while the gate circuits 206 and 213 are switched from the switched on state over into the switched off state. When in this state, the control signal is transferred from the control circuit 221 to the shift register 201, the shift register 201 brings the first switching element in the analog switch 202 corresponding to the light sensing element 1' into the switched on state so as to transfer the output of the light sensing element 1' to the analog amplifier 203 which logarithmically compresses and amplifies the output of the light sensing element 1'. The output logarithmically compressed and amplified, of the light sensing element 1' is converted into a digital value by means of the A-D converting means 204 and registered in the register 205. After then by means of the control signal produced by the control circuit 221 the signal value registered in the register 205, of the output of the light sensing element 1' is transferred to the register 211 through the gate circuit 209 and the addition means 210.

When the signal value registered in the register 205 is transferred to the register 211, the control circuit 221 sends a control signal to the shift register 201, bringing the second switching element corresponding to the light sensing element 2', in the analog switch 202 into switched on state so as to transfer the output of the light sensing element 2' to the logarithmic amplifier 203, whereby the output of the light sensing element 2' is processed likely to the case of the light sensing element 1', registered in the register 205 and transferred to the addition means 210 through the gate circuit 209. After being added to the signal value registered in the register 211, of the output of the light sensing element 1', the signal value transmitted to the addition means 210, of the output of the light sensing element 2' is again registered in the shift register 211. Then the same process is repeated down to the light sensing element n, whereby in the register 211 the total sum of the signal values of the outputs of the light sensing elements 1' to n', is registered. When the total sum of the signal values of the outputs of the light sensing elements 1' to n' has been registered in the register 211, the control circuit 221 sends a control signal to the shift register 201 so as to bring the shift register 201 out of operation and transfer the total sum of the signal values registered in the register 211, of the output of the light sensing elements 1' to n' to the division circuit 218. As the division circuit 218 has been programmed in advance in such a manner that the value registered in the register 211 might be devided by the total number (n') of the light sensing elements, the then signal value registered in the register 211 is devided by the total number (n') of the light sensing elements and led to the processing means 219 as the value of the measured light of the object to be photographed.

On the other hand, at this time, depending upon the exposure control system selected by the switch 222 namely according to whether the diaphragm is to be controlled automatically by means of the diaphragm control device 220 or the shutter time is to be controlled automatically by means of the shutter time control device 220' the shutter time value $T_v$ logarithmically compressed, amplified and converted into digital value or the diaphragm value $A_v$ also logarithmically compressed, amplified and converted into digital value has been given to the processing means 219 together with the film sensitivity $S_v$ also logarithmically compressed, amplified and converted into digital value in such a manner that the processing means 219 processes the above mentioned value of the measured light of the object to be photographed together with the shutter speed value $T_v$ and the film sensitivity $S_v$ or with the diaphragm value $A_v$ and the film sensitivity $S_v$ so as to produce the exposure value. Depending upon the connected state of the switch 222 the exposure value is given to the diaphragm control device 220 or to the shutter time control device 220' in such a manner that the diaphragm value or the shutter time value is automatically controlled while the then exposure value, namely the diaphragm value or the shutter time value is indicated by means of the indication device 220". Thus all the exposure measurement operation has been completed.

FIG. 11 shows generally an embodiment of the system for measuring the exposure and detecting the focus point by means of a common image senser in accordance with the present invention, whereby the system is built in a practical camera. In the drawing $L_7$ is the photographic optical system been held by means of the lens barrel 223 and movable along the optical axis, whereby the optical system $L_7$ is forced to the right in the drawing by means of a spring 224 provided between the lens barrel 223 and the camera body so as to normally assume the focus position at the infinitive distance by the effect of the spring.

On one part of the lens barrel 223 a rack 223a is provided in such a manner that the rack 223a is engaged with the gear 227 provided on the output shaft 217a of the driving source 217 of the photographic optical system $L_7$, whereby in the drawing the driving source 217 is shown as a motor.

$L_8$ is the additional image forming optical system for measuring the light and the distance, being held by means of the lens barrel 225 connected by means of a joint member 226 with the lens barrel 223 holding the photographic optical system $L_7$ and movable along the optical axis in functional engagement with the photographic optical system. The above mentioned image senser IS is provided in the optical path of the image forming optical system $L_8$.

228 is the conventional diaphragm blade provided in the above mentioned lens barrel 223 whereby the diameter of the opening is controlled by means of the above mentioned diaphragm control device 220. The state is shown generally by the dotted line 228' in the drawing.

229 is the operation member for the conventional focal plane shutter, whereby the operation speed is controlled by means of the above mentioned shutter time control device 220'. The state is generally shown by the dotted line 229' in the drawing.

230 is the film, 231 the movable mirror of the conventional single reflex camera, M the circuit block including circuitries 201 – 216, 218, 219 and 221 in FIG. 10 and 232 the two step release button constructed in such a manner that the circuit block M is brought into operation at the first step, while the movable mirror and the shutter are brought into operation at the second step.

The above mentioned focussing position indication device 217' and the above mentioned exposure value indication device 220" is provided, as shown in the drawing, in the optical path of the view finder in such a manner that the indication can be seen in the view finder.

Below the operation of the above mentioned camera will be explained. When the camera is directed toward the desired object to be photographed and the release button 232 is pushed down to the first step, the circuit block M is brought into operation so as to start the focus point detecting operation of the photographic optical system as well as the exposure measurement operation as mentioned above.

Namely at first by means of the image sensor IS the image formed by the image forming optical system $L_8$, of the object to be photographed is scanned and then the motor 217 starts to rotate along the direction of the arrow in the drawing by means of the output of the circuit block M due to the then scanning signal in such a manner that the photographic optical system $L_7$ is advance along the direction of the arrow in the drawing from the focus point at infinitive distance against the strength of the spring 224. At this time, the image forming optical system $L_8$ also advances along the direction of the arrow in the drawing in functional engagement of the photographic optical system $L_7$, whereby when the both optical systems $L_7$ and $L_8$ reach the focussing position of the object to be photographed during the advance process of these optical systems $L_7$ and $L_8$, the image formed on the image senser IS by means of the optical system $L_8$, of the object to be photographed is sharpest in such a manner that the circuit block M immediately stops the motor 217 by means of the then scanning signal of the image senser IS so as to hold the both optical systems $L_7$ and $L_8$ at this focussing position and at the same time brings the focus point indication device 217' into operation so as to indicate that the photographic optical system $L_7$ reaches the focussing position. In this state, the image of the object to be photographed in sharpest on the film 230.

As soon as the focus point adjusting operation of the photographic optical system $L_7$ has been finished, the system assumes the exposure measurement operation. The then state of the exposure control is determined in accordance with the selected state of the switch 222. Namely when the switch 222 is connected with the diaphragm control device 220 the diaphragm is automatically controlled with priority on shutter time while the switch 222 is connected with the shutter time control device 220' the shutter time is automatically controlled with priority on diaphragm. (In the state shown in the drawing the diaphragm is automatically controlled.)

In consequence at the time of the exposure measurement, it is necessary for the photographer to determine the state of the exposure control by means of the switch, giving in advance to the circuit block M, the film sensitivity value $S_v$ and the shutter time value $T_v$, when the automatic diaphragm control is desired and the film sensitivity value $S_v$ and the diaphragm value $A_v$ when the automatic diaphragm control is desired. (In consequence, in the state shown in the drawing the shutter time value $T_v$ has to be determined in advance.)

By means of the above mentioned operation, the system processes the exposure value suited for the then conditions of the photographic field from the value of the measured light of the photographic field of the image sensor IS, the film sensitivity Sv and the shutter time value Tv or the diaphragm value Av, namely the shutter time value in case of the automatic shutter time control and the diaphragm value in case of the automatic diaphragm control so as to indicate it by the indication device 220", while in case of the automatic shutter time control the operating speed of the operating member 229 is automatically controlled by means of the control device 220' and in case of the automatic diaphragm control the diameter of the opening of the diaphragm blade 228 is automatically controlled by means of the control device 220. Thus the automatic control of the exposure suited for the then condition of the photographic field has been completed.

When in this state, the release button 232 is pushed down to the second step the movable mirror 231 is retired out of the photographic optical path while the shutter is operated so as to exposure the film 230 at the proper focussing and the proper exposure.

When the release button 232 is returned to the initial position the current supply to the circuit block M is interrupted so that the photographic optical system $L_7$ is automatically returned to the focussing position at infinitive distance by means of the strength of the spring 224.

As explained above, in case of the system for the focus detection and the exposure measurement by means of a common image senser in accordance with the present invention, the light sensing device to be used in common for the focus detection and the exposure measurement consists of a number of fine light sensing elements while the output of each light sensing element is processed after having been converted into digital value so that the electrical processing is remarkably easy as compared with the conventional system in which the signal is processed as analog amount, whereby the signal processing circuit is remarkably simplified while the signal process is controlled with high stability so that it is possible to keep the measurement error at the signal process as small as possible. Especially in case of the system in accordance with the present invention all the signal processing is controlled in a digital way so that the control at the signal processing becomes much simplified whereby it is possible to apply a number of the light sensing elements in the light sensing device and therefore a further exact measurement.

Hereby in case of the present invention, it goes without saying that the diaphragm diameter or the shutter time can manually be controlled in accordance with the exposure value indicated by means of the indication device 220", eliminating the diaphragm control device 220 and the shutter time control device 220' or that only the control device 220 or 220' is provided.

Further, it is also possible to eliminate the driving source 217 for the automatic focus point adjustment of the optical system so as to manually adjust the focussing position of the photographic optical system by means of the indication device 217'.

What is claimed is:
1. An exposure measurement system comprising;
   a plurality of photoelectric converting elements each for converting a portion of a light beam into an electrical signal corresponding to a portion of the light beam,
   scanning means electrically coupled with said elements for sensing the outputs of the elements one after another,
   digital converting means coupled to said scanning means for converting the sensed outputs of the photoelectric converting elements into digital signals,
   a processing device coupled to said digital converting means for processing the output of the photoelectric converting elements converted into digital values by means of the digital converting means in accordance with a predetermined estimation function so as to determine an exposure value.
2. An exposure measurement system in accordance with claim 1, further comprising;
   an indication means electrically coupled to the processing device for indicating the exposure value on the basis of the exposure measurement information produced by the processing device.
3. An exposure measurement system in accordance with claim 1, said processing device comprising;
   an addition circuit electrically connected with the digital converting means for summing a plurality of the outputs of the photoelectrical converting elements converted into digital value,
   a division circuit electrically coupled to the addition circuit for dividing the value obtained from the addition circuit by the number of the elements whose outputs have been summed by the addition circuit,
   a processing circuit electrically coupled to the division circuit for processing the exposure value in accordance with the output value of the division circuit.
4. An exposure measurement system in accordance with claim 1, said processing device comprising;
   a first addition circuit for summing all the outputs of the photoelectric converting elements converted into digital values, said circuit being electrically coupled to the digital converting means,
   a first division circuit for dividing the value obtained from the first addition circuit by the total number of the elements, said circuit being electrically coupled to the first addition circuit,
   a second addition circuit for summing a predetermined number of the outputs of the photoelectric converting elements converted into digital values less than the total number of the outputs of the photoelectric converting elements converted in digital values, said circuit being electrically coupled to the digital converting means,
   a second division circuit for dividing the value obtained from the second addition circuit by the number of the elements whose outputs have been summed by the second addition circuit, said circuit being electrically coupled to the second addition circuit,
   selection means electrically coupled to both of the division circuits for selecting the value from the second division circuit when the difference between the value from the first division circuit and that from the second division circuit is larger than a predetermined value, and for selecting the value from the first division circuit when the difference is smaller than the predetermined value,
   a processing circuit for processing the exposure value on the basis of the output value selected by the selection means, said circuit being electrically coupled to the selection means.
5. An exposure measurement system in accordance with claim 5, further comprising:

switch means for actuating at least one of said first addition and division circuits and second addition and division circuits, said switch means being electrically coupled to the first addition and division circuits and second addition and division circuits.

6. An exposure control system comprising
a plurality of photoelectric converting elements each for converting a portion of a light beam into an electrical signal corresponding to a portion of the light beam,
scanning means electrically coupled with said elements for sensing the outputs of the elements one after another,
digital converting means coupled to said scanning means for converting the sensed outputs of the photoelectric converting elements into digital signals,
a processing device coupled to said digital converting means for processing the output of the photoelectric converting elements converted into digital values by means of the digital converting means in accordance with a predetermined estimation function so as to determine an exposure value, and
exposure adjusting means electrically coupled to the processing device for adjusting the exposure value on the basis of the exposure measurement information produced by the processing device.

7. An exposure measurement system for a camera comprising;
photoelectric converting means for converting light beam into electrical signals, said means being arranged in the path of the light beam coming from a photographic scene to be photographed by the camera and comprising a number of photoelectric converting elements for producing the electrical outputs corresponding to the brightness of the photographic scene,
series detecting means for sequentially sensing the outputs of the photoelectric converting elements, said means being electrically coupled to the photoelectric converting means and sensing the outputs of the photoelectric converting elements in sequence and transmitting the outputs of the photoelectric converting elements one by one,
digital converting means for successively converting the successive outputs of the detecting means into digital values, said means being electrically coupled to the output terminal of the photoelectric converting means,
a processing device for determining the exposure value by processing the outputs converted into digital values by means of the digital converting means in accordance with a predetermined estimation function, so as to determine the exposure value, said device comprising;
addition means for summing a plurality of the outputs of the photoelectric converting elements converted into digital values of the photoelectric converting elements, said means being electrically coupled to the digital converting means,
division means for dividing the value obtained from the addition means by the number of the elements whose outputs have been summed by the addition means, said means being electrically coupled to the addition means,
processing means for processing the exposure value on the basis of the value obtained from the dividing means, said means being electrically coupled to the dividing means.

8. A camera capable of an exposure measurement by converting the light beam coming from the photographic scene through a photo-taking optical system into electrical signals comprising;
image sensing means including a number of the photoelectric converting elements, said means being arranged in the path of the light beam coming through the photo-taking optical system and producing outputs corresponding to the brightness of the photographic scene,
time series means for producing a time series of the outputs of the photoelectric converting elements, said series means being electrically coupled to the image sensing means and producing a time series of the outputs of the photoelectric converting elements by transmitting the outputs of the photoelectric converting elements one by one,
digital converting means for successively converting the time series of the outputs of the photoelectric converting elements produced by means of the time series means into digital values, said means being electrically coupled to the image sensing means,
a processing device for determining the exposure value by processing the outputs converted into digital values by means of the digital converting means in accordance with a predetermined estimation function so as to determine the exposure value, said device being electrically coupled to the digital converting means.

9. A camera in accordance with claim 8 further comprising;
indication means for indicating the exposure value determined by the processing device, said means being electrically coupled to the processing device.

10. A camera in accordance with claim 8, further comprising;
an exposure adjustment device for adjusting the exposure in accordance with the exposure value determined by means of the processing device, said device being electrically coupled to the processing device.

11. A camera in accordance with claim 8, said processing device comprising;
an addition circuit for summing a plurality of the outputs of the photoelectrical converting elements converted into digital value, said circuit being electrically coupled to the digital converting means,
a division circuit for dividing the value obtained from the addition circuit by the number of the elements whose outputs have been summed by the addition circuit, said circuit being electrically coupled to the addition circuit,
a processing circuit for processing the exposure value in accordance with the value obtained from the division circuit, said circuit being electrically coupled to the division circuit.

12. A camera in accordance with claim 8, said processing device comprising:
a first addition circuit for summing all the outputs of the photoelectric converting elements converted into digital values, said circuit being electrically coupled to the digital converting means,
a first division circuit for dividing the value produced by the first addition circuit by the total number of the elements, said circuit being electrically coupled to the first addition circuit, a second addition circuit for summing a predetermined number of outputs of the elements converted into digital values less than the total number of the outputs of the photoelectric converting elements converted into digital values, said circuit being electrically coupled to the digital converting means, a second division circuit for dividing the value produced by the second addition circuit by the number of the elements whose outputs have been summed by the second addition circuit, said circuit being electrically coupled to the second addition circuit, selection means for selecting the value produced by the first division circuit or that produced by the second division circuit, said selection means being electrically coupled to both of the division circuits so as to select the value produced by the second division circuit when the difference between the value produced by the first division circuit and that produced by the second division circuit is larger than a predetermined value, and select the value produced by the first division circuit when the difference is smaller than the predetermined value, a processing circuit for processing the exposure value in accordance with the value selected by the selection means, said circuit being electrically coupled to the selection means.

13. A camera in accordance with claim 12, further comprising;

switch means for actuating either the first addition and division circuits or the second addition and division circuits, said switch means being electrically connected with the first and the second addition and division circuits.

14. A system comprising;

an image forming optical system, at least a part of said optical system being movable along an optical axis so as to form an image of an object at a predetermined position, photoelectric converting means for converting a light beam into electrical signals, said converting means being arranged at the predetermined position and comprising a number of photoelectric converting elements each producing an electrical output corresponding to a portion of the light beam, time series means coupled to the elements for producing a time series of the outputs of the photoelectric converting elements, said series means being electrically connected with the photoelectric converting elements and making the time series of the outputs of the photoelectric converting elements by successively transmitting the outputs of the photoelectric converting elements, digital converting means coupled to the photoelectric converting means for successively converting the time series outputs of the photoelectric converting elements into digital values, a processing device for processing the outputs of the photoelectric converting elements converted into digital values by means of the digital converting means in accordance with a predetermined estimation function so as to detect the focusing condition of the image forming optical system, said device being electrically coupled to the digital converting means so as to produce focusing information of the optical system by processing the outputs of the photoelectric converting elements converted into digital values in accordance with the predetermined estimation function.

15. A system in accordance with claim 14, further comprising:

indication means for indicating the focusing condition of the image forming optical system on the basis of the focusing information produced by the processing device.

16. A system according to claim 14, further comprising;

adjusting means for adjusting the image forming optical system in response to the output of the processing device so that the object image is formable at the predetermined position, said means being functionally engaged with the image forming optical system and electrically coupled to the processing device.

17. A camera comprising:

a photo-taking optical system, at least a part of said system being movable along an optical axis so as to form an image of the object to be photographed at a predetermined position, image sensing means including a number of photoelectric converting elements arranged on a same plane, said sensing means being arranged at a position optically equivalent to the predetermined position and each element in said means producing an electrical output corresponding to a portion of a light beam coming through said optical system, time series means for producing a time series of the outputs of the photoelectric converting elements, said time series means being electrically coupled to the image sensing means and producing the time series of the outputs by successively transmitting the outputs of the photoelectric converting means, digital converting means for successively converting the time series outputs of the photoelectric converting elements, into digital values, said converting means being electrically coupled to the image sensing means, a processing device for processing the outputs of the photoelectric converting elements converted into digital values by means of digital converting means in accordance with a predetermined estimation function so as to detect the focusing condition of the optical system, said device being electrically coupled to the digital converting means so as to produce focusing information by processing the outputs of the photoelectric converting elements converted into digital values in accordance with the predetermined estimation function.

18. A camera in accordance with claim 17, further comprising;

indication means coupled to the processing device for indicating the focusing condition of the photo-taking optical system in accordance with the focusing information produced by the processing device.

19. A camera in accordance with claim 17, further comprising;

adjusting means for adjusting the photo-taking optical system in accordance with the focusing information produced by the processing device so that the image of the object to be photographed may be formed at the predetermined position, said adjusting means being functionally engaged with the movable part of the photo-taking optical system and electrically connected with the processing device.

20. A camera in accordance with claim 17, said processing device comprising;
- a processing circuit for producing the absolute values of the differences between the outputs of pairs of adjacent photoelectric converting elements converted into digital values, said circuit being electrically coupled to the digital converting means,
- an integrating circuit for successively integrating the values produced by the processing circuit, said circuit being electrically coupled to the processing circuit,
- a detecting circuit for detecting the maximum value of the value produced by the integrating circuit during the variation of the same in accordance with the movement of the movable part of the photo-taking optical system, said circuit being electrically coupled to the integrating circuit and producing a focusing signal when the maximum value of the integrated values is detected.

21. A camera in accordance with claim 20, further comprising;
- driving means capable of responding to the focussing signal produced by the detecting circuit and of moving the movable part of the photo-taking optical system along the optical axis, said driving means being functionally engaged with the movable part of the photo-taking optical system and electrically coupled to the detecting circuit so as to move the movable part of the photo-taking optical system along the optical axis until the detecting circuit produces the focussing signal.

22. A camera in accordance with claim 20, further comprising;
- indication means for indicating the focussing condition relative to the object to be photographed, of the photo-taking optical system in accordance with the focussing signal produced by the detecting circuit, said indication means being electrically connected with the detecting circuit.

23. A system capable of both exposure measurement and detection of focusing condition of an image forming optical system settable along an optical axis to form an image of an object at a predetermined position, comprising
- photoelectric converting means for converting a light beam into electrical signals, said converting means being arranged at the predetermined position, and including a number of photoelectric converting elements producing electric outputs corresponding to the light beam,
- time series producing means coupled to said converting elements for producing a time series of the outputs of the photoelectric converting elements by successively transmitting the outputs of the photoelectric converting elements,
- digital converting means for successively converting the time series outputs of the photoelectric converting elements produced by the time series means into digital values, said converting means being electrically connected with the photoelectric converting means,
- a first processing device for processing the outputs of the photoelectric converting elements converted into digital values in accordance with a first predetermined estimation function so as to detect the focusing condition of the optical system, said device being electrically connected with the digital converting means,
- a second processing device for processing the outputs of the photoelectric converting elements converted into digital values by means of the digital converting means on the basis of a second predetermined estimation function, so as to determine an exposure value, said second processing device being electrically connected with the digital converting means.

24. A system in accordance with claim 23, further comprising;
- indication means coupled to the first processing device for indicating the focusing condition of the image forming optical system in accordance with the focus point detection information produced by the first processing device.

25. A system in accordance with claim 23, further comprising;
- indication means for indicating the exposure value determined by the exposure measurement information produced by the second processing device, said means being electrically connected with the second processing device.

26. A system for exposure measurement and focus adjustment of an image forming optical system settable along an optical axis to form an image of an object at a predetermined position, comprising
- photoelectric converting means for converting a light beam into electrical signals, said converting means being arranged at the predetermined position, and including a number of photoelectric converting elements producing electric outputs corresponding to the light beam,
- time series producing means coupled to said converting elements for producing a time series of the outputs of the photoelectric converting elements by successively transmitting the outputs of the photoelectric converting elements,
- digital converting means for successively converting the time series output of the photoelectric converting elements produced by the time series means into digital values, said converting means being electrically connected with the photoelectric converting means,
- a first processing device for processing the outputs of the photographic converting elements converted into digital values in accordance with a first predetermined estimation function so as to detect the focusing condition of the optical system, said device being electrically connected with the digital converting means,
- a second processing device for processing the outputs of the photoelectric converting elements converted into digital values by means of the digital converting means on the basis of a second predetermined estimation function, so as to determine an exposure value, said second processing device being electrically connected with the digital converting means, and
- adjusting means for adjusting the image forming optical system in accordance with the output of the first processing device, so that the image of the object may be formed at the predetermined position, said means being functionally engaged with the image forming optical system and electrically connected with the first processing device.

27. A system for exposure control and detection of focusing condition of an image forming optical system setting along an optical axis to form an image of an object at a predetermined position, comprising photoelectric converting means for converting a light beam into electrical signals, said converting means being arranged at the predetermined position, and including a number of photoelectric converting elements producing electric outputs corresponding to the light beam, time series producing means coupled to said converting elements for producing a time series of the outputs of the photoelectric converting elements by successively transmitting the outputs of the photoelectric converting elements, digital converting means for successively converting the time series outputs of the photoelectric converting elements produced by the time series means into digital values, said converting means being electrically connected with the photoelectric converting means, a first processing device for processing the outputs of the photoelectric converting elements converted into digital values in accordance with a first predetermined estimation function so as to detect the focusing condition of the optical system, said device being electrically connected with the digital converting means, a second processing device for processing the outputs of the photoelectric converting elements converted into digital values by means of the digital converting means on the basis of a second predetermined estimation function, so as to determine an exposure value, said second processing device being electrically connected with the digital converting means, and exposure adjusting means for adjusting the exposure value on the basis of the exposure measurement information produced by the second processing device, said means being electrically connected with the second processing devices.

28. A camera capable of both exposure measurement and focus point detection of a photo-taking optical system settable along an optical axis so as to form an image of an object at a predetermined position comprising;

image sensing means having a number of photoelectric converting elements arranged a same plane, said sensing means being arranged at a position optically equivalent to the predetermined position and each element in said means producing an electrical output corresponding to a portion of a light beam coming through the optical system from the object, time series means for producing a time series of the outputs of the photoelectric converting elements said means being electrically connected with the image sensing means and producing the time series of the photoelectric converting elements by successively delivering the outputs of the photoelectric converting elements, digital converting means for successively converting the time series outputs of the photoelectric converting elements produced by the time series means into digital values, said means being electrically connected with the image sensing means, a first processing device for processing the outputs of the photoelectric converting elements converted into digital values by means of the digital converting means, in accordance with a first predetermined estimation function, so as to detect the focusing condition of the optical system, said device being electrically connected with the digital converting means and producing focusing detection information of the optical system by processing the outputs of the elements converted into digital values in accordance with the first estimation function, a second processing device for processing the outputs of the photoelectric converting elements converted into digital values by means of the digital converting means in accordance with a second predetermined estimation function, so as to determine the exposure value, said device being electrically connected with the digital converting means and producing the exposure measurement information by processing the outputs of the elements converted into digital values in accordance with the second estimation function.

29. A camera in accordance with claim 28, said first processing device comprising;

a processing circuit for producing the absolute values of the differences between the outputs of pairs of adjacent photoelectric converting elements converted into digital values, said circuit being electrically coupled to the digital converting means, an integrating circuit for successively integrating the values produced by the processing circuit, said circuit being electrically coupled to the processing circuit, a detecting circuit for detecting the maximum value of the value produced by the integrating circuit during the variation of the same in accordance with the movement of the movable part of the photo-taking optical system, said circuit being electrically coupled to the integrating circuit and producing a focusing signal when the maximum value of the integrated value is detected.

30. A camera in accordance with claim 29, further comprising;

driving means capable of responsing to the focussing signal produced by the detection circuit and of moving the movable part of the optical system along the optical axis, said means being functionally engaged with the movable part of the optical system and electrically connected with the detecting circuit, so as to move the movable part of the optical system along the optical axis until the detecting circuit produces the focussing signal.

31. A camera in accordance with claim 29, further comprising;

indication means for indicating the focussing condition relative to the object to be photographed, of the optical system in accordance with the focussing signal produced by the detecting circuit, said means being electrically connected with the detecting circuit.

32. A camera in accordance with claim 28, said second processing device comprising:

an addition circuit for successively adding the outputs of the photoelectric converting elements converted into digital values, said circuit being electrically connected with the digital converting means, a dividing circuit for dividing the values obtained from the addition circuit by the total number of the photoelectric converting elements, said dividing circuit being electrically connected with the addition circuit, a processing circuit for processing the exposure value in accordance with the value obtained from the dividing circuit.

33. A camera in accordance with claim 32, further comprising;
  indication means for indicating the exposure value on the bases of the value obtained from the processing circuit, said indication means being electrically connected with the processing circuit.

34. A camera in accordance with claim 32, further comprising;
  exposure adjusting means for adjusting the exposure on the basis of the value obtained from the processing circuit, said adjusting means being electrically connected with the processing circuit.

35. A system capable of either exposure measurement or the detection of focusing condition of an optical system comprising;
  a plurality of photoelectric converting elements for converting light beam into electrical signals, each photoelectric converting element producing an electrical output corresponding to a portion of the light beam,
  sequential sensing means for successively transmitting the outputs of successive ones of the photoelectric converting elements, said sensing means being electrically connected with the photoelectric converting elements,
  digital converting means for converting the outputs successively transmitted by means of the sensing means, of the photoelectric converting elements into digital values,
  a processing device for processing the outputs of the photoelectric converting elements converted in digital values by means of the digital converting means either in accordance with a first predetermined estimation function so as to determine a exposure value, or in accordance with the predetermined second estimation function so as to detect the focusing condition of the optical system, said device being electrically connected with the digital converting means in such a manner that either exposure measurement information or focusing condition information is produced by processing the outputs of the photoelectric converting elements converted into digital value in accordance with either of the estimation functions.

36. A system capable of either exposure measurement or detection of focusing condition of an image forming optical system at least one part of which is movable along an optical axis so as to form an image of an object at a predetermined position, comprising
  photoelectric converting means for converting light beam into electrical signals, said means being arranged at the predetermined position and including a plurality of photoelectric converting elements, each element producing an output corresponding to a portion of the input light beam,
  time series means for making a time series of the outputs of the photoelectric converting elements, said means being electrically connected with the photoelectric means, so as to make the time series of the outputs of the photoelectric converting elements by successively delivering the outputs of the elements one by one,
  digital converting means for successively converting the time series outputs, of the photoelectric elements into digital values, said means being electrically connected with an output terminal of the photoelectric converting means,
  a processing device for processing the outputs of the photoelectric converting elements converted in digital values by means of the digital converting means either in accordance with a first predetermined estimation function, so as to determine the exposure value or in accordance with a second predetermined estimation function, so as to detect the focusing condition of the optical system, said device being electrically connected with the digital converting means in such a manner that either the exposure measurement information or information relating with the focusing condition is produced by processing the outputs of the photoelectric converting elements converted into digital values, of the photoelectric converting elements in accordance with either of the estimation functions.

37. A camera capable of either exposure measurement or detection of focusing condition of image forming optical system by converting the light beam into electrical signal comprising;
  image sensing means including a plurality of photoelectric converting elements arranged on the same plane, said means being arranged at a position, at which light coming through the optical system can be caught, each photoelectric converting elements producing an output corresponding to a portion of the light,
  time series means for successively delivering the outputs of the photoelectric converting elements, said means being electrically connected with the image sensing means,
  digital converting means for successively converting the outputs successively delivered by means of the time series means, of the photoelectric converting elements into digital values, said means being electrically connected with an output terminal of the image sensing means,
  a processing device for processing the outputs converted in digital value by means of the digital converting means, of the photoelectric converting elements either in accordance with a first predetermined estimation function, so as to determine the exposure value or in accordance with a second predetermined estimation function, so as to detect the focusing condition of the optical system, said device being electrically connected with the digital converting means, receiving the outputs converted into digital values, of the photoelectric converting elements and producing either exposure measurement information or information relating with the focusing condition of the photographic optical system by processing the outputs in accordance with either of the estimation functions.

38. For a camera capable of exposure measurement in an optional zone of a photographic scene and having means for setting one or more other exposure factors; an exposure regulating arrangement, comprising;
  image sensing means including a plurality of photoelectric converting elements regularly arranged on a same plane, said sensing means being arranged at a position in the path of a light beam from the photographic scene, each of said converting elements producing an electrical signal corresponding to a portion of the light beam,
  time series means for making a time series of the outputs of said photoelectric converting elements, said time series means being electrically connected with said image sensing means so as to make a time series of the outputs of the converting elements by successively delivering the outputs of the converting elements in accordance with the order of the arrangement of the converting elements, brightness determining means for detecting the brightness of the photographic scene on the basis of the outputs of the photoelectric converting elements, said brightness detecting means being electrically connected with the image sensing means and detecting the brightness of the photographic scene by processing at most all the outputs of the photoelectric converting elements and exposure determining means for determining an exposure value on the basis of the output of said brightness detecting means and one or more of the other preset exposure factors, said exposure determining means being electrically connected with the brightness detecting means.

* * * * *